(12) United States Patent
Liu et al.

(10) Patent No.: US 10,846,564 B2
(45) Date of Patent: Nov. 24, 2020

(54) CAPTURING A CLUSTER EFFECT WITH TARGETED DIGITAL-CONTENT EXPOSURES

(71) Applicant: Facebook, Inc., Menlo Park, CA (US)

(72) Inventors: Wei Liu, San Jose, CA (US); Andrey Vladimirovich Bannikov, Seattle, WA (US)

(73) Assignee: FACEBOOK, INC., Menlo Park, CA (US)

( * ) Notice: Subject to any disclaimer, the term of this patent is extended or adjusted under 35 U.S.C. 154(b) by 366 days.

(21) Appl. No.: 15/862,430

(22) Filed: Jan. 4, 2018

(65) Prior Publication Data

US 2019/0205698 A1    Jul. 4, 2019

(51) Int. Cl.
| | | |
|---|---|---|
| G06K 9/62 | (2006.01) |
| G06Q 50/00 | (2012.01) |
| H04L 29/08 | (2006.01) |
| G06F 16/907 | (2019.01) |
| G06F 16/9535 | (2019.01) |
| G06Q 30/02 | (2012.01) |

(52) U.S. Cl.
CPC ......... *G06K 9/6218* (2013.01); *G06F 16/907* (2019.01); *G06F 16/9535* (2019.01); *G06Q 30/0241* (2013.01); *G06Q 30/0242* (2013.01); *G06Q 30/0243* (2013.01); *G06Q 30/0244* (2013.01); *G06Q 30/0245* (2013.01); *G06Q 50/01* (2013.01); *H04L 67/22* (2013.01)

(58) Field of Classification Search
CPC .... G06Q 10/04; G06Q 30/02; G06Q 30/0201; G06Q 30/0202; G06Q 30/0203; G06Q 30/0204; G06Q 30/0205; G06Q 30/0242; G06Q 30/0243; G06Q 30/0244; G06Q 30/0245; G06Q 30/0251; G06Q 30/0254; G06Q 30/0241; G06Q 50/01; G06K 9/6218; G06F 16/907; G06F 16/9535; H04L 67/22
See application file for complete search history.

(56) References Cited

U.S. PATENT DOCUMENTS

| | | | | |
|---|---|---|---|---|
| 2010/0070335 A1* | 3/2010 | Parekh | ........... | G06Q 30/02 705/14.52 |
| 2011/0106496 A1* | 5/2011 | Napolin | ........... | G06Q 10/06 702/182 |
| 2012/0030010 A1* | 2/2012 | Krishnamoorthy | ........... | G06Q 30/0241 705/14.43 |
| 2013/0325605 A1* | 12/2013 | Callaghan | ........... | G06Q 30/02 705/14.53 |

(Continued)

*Primary Examiner* — David T. Brooks
(74) *Attorney, Agent, or Firm* — Keller Jolley Preece

(57) ABSTRACT

This disclosure covers methods, non-transitory computer readable media, and systems that determine a cluster effect representing the impact that a user's digital-content exposure has on other users' conversion actions. The disclosed methods, non-transitory computer readable media, and systems detect the downloads, purchases, or other forms of consumption of a featured item that result from users within the same cluster viewing digital content featuring the item. In some embodiments, the methods, non-transitory computer readable media, and systems apply the cluster effect by, for example, generating a conversion report representing the cluster effect or by providing tools that exploit the cluster effect in distributing digital content.

20 Claims, 12 Drawing Sheets

(56) References Cited

U.S. PATENT DOCUMENTS

| | | | |
|---|---|---|---|
| 2014/0089048 A1* | 3/2014 | Bruich | G06Q 30/0201 |
| | | | 705/7.32 |
| 2014/0114748 A1* | 4/2014 | Bruich | G06Q 30/0246 |
| | | | 705/14.45 |
| 2014/0324567 A1* | 10/2014 | Saldanha | G06Q 30/0242 |
| | | | 705/14.41 |
| 2014/0337359 A1* | 11/2014 | Airoldi | G06F 16/24578 |
| | | | 707/748 |
| 2015/0019639 A1* | 1/2015 | Marlow | H04W 4/21 |
| | | | 709/204 |
| 2016/0140601 A1* | 5/2016 | Blackhurst | G06Q 30/0244 |
| | | | 705/14.43 |
| 2016/0253683 A1* | 9/2016 | Gui | G06Q 30/0201 |
| | | | 705/7.32 |
| 2016/0253696 A1* | 9/2016 | Gui | G06Q 50/01 |
| | | | 705/14.42 |
| 2017/0068987 A1* | 3/2017 | Levinson | G06Q 30/0275 |
| 2017/0178157 A1* | 6/2017 | Jayaram | G06Q 30/0244 |
| 2017/0357998 A1* | 12/2017 | Scharf | G06Q 30/0277 |

* cited by examiner

502

| User Identifier | Cluster Identifier A | Cluster Identifier B | Super Cluster Identifier |
|---|---|---|---|
| 136 | 123A | 620B | 276S |
| 137 | 123A | 647B | 276S |
| 138 | 118A | 647B | 276S |
| 139 | 164A | 623B | 249S |
| 140 | 164A | 623B | 249S |
| 141 | 188A | 623B | 249S |
| 142 | 133A | 644B | 263S |
| 143 | 133A | 644B | 263S |
| 144 | 122A | 601B | 255S |
| 145 | 199A | 638B | 280S |
| 146 | 138A | 638B | 280S |
| 147 | 138A | 699B | 280S |
| 148 | 120A | 676B | 216S |
| 149 | 120A | 676B | 216S |
| 150 | 120A | 601B | 219S |
| 151 | 101A | 655B | 219S |
| 152 | 101A | 655B | 219S |
| 153 | 158A | 673B | 226S |
| 154 | 158A | 673B | 226S |
| 155 | 158A | 650B | 200S |
| 156 | 105A | 650B | 200S |
| 157 | 103A | 650B | 200S |
| 158 | 103A | 616B | 200S |

504 / 506a / 506b / 508

510a — First Group

| User Identifier | Cluster Identifier A | Cluster Identifier B | Super Cluster Identifier |
|---|---|---|---|
| 139 | 164A | 623B | 249S |
| 140 | 164A | 623B | 249S |
| 141 | 188A | 623B | 249S |
| 142 | 133A | 644B | 263S |
| 143 | 133A | 644B | 263S |
| 144 | 122A | 601B | 255S |
| 151 | 101A | 655B | 219S |
| 152 | 101A | 655B | 219S |
| 156 | 105A | 650B | 200S |
| 157 | 103A | 650B | 200S |
| 158 | 103A | 616B | 200S |

510b — Second Group

| User Identifier | Cluster Identifier A | Cluster Identifier B | Super Cluster Identifier |
|---|---|---|---|
| 136 | 123A | 620B | 276S |
| 137 | 123A | 647B | 276S |
| 138 | 118A | 647B | 276S |
| 145 | 199A | 638B | 280S |
| 146 | 138A | 638B | 280S |
| 147 | 138A | 699B | 280S |
| 148 | 120A | 676B | 216S |
| 149 | 120A | 676B | 216S |
| 150 | 120A | 601B | 216S |
| 153 | 158A | 673B | 226S |
| 154 | 158A | 673B | 226S |
| 155 | 158A | 673B | 226S |

*Fig. 5A*

512a ⎯ First Test Group

| User Identifier | Cluster Identifier A | Cluster Identifier B | Super Cluster Identifier | Ad | Purchase | Conversion |
|---|---|---|---|---|---|---|
| 151 | 101A | 655B | 219S | x | | |
| 152 | 101A | 655B | 219S | | x | x |
| 144 | 122A | 601B | 255S | | | |
| 156 | 105A | 650B | 200S | | | |
| 157 | 103A | 650B | 200S | | x | x |
| 158 | 103A | 616B | 200S | x | | |

516a / 518a / 520a

514a ⎯ First Control Group

| User Identifier | Cluster Identifier A | Cluster Identifier B | Super Cluster Identifier | Purchase | Conversion |
|---|---|---|---|---|---|
| 139 | 164A | 623B | 249S | | |
| 140 | 164A | 623B | 249S | | |
| 141 | 188A | 623B | 249S | | |
| 142 | 133A | 644B | 263S | | |
| 143 | 133A | 644B | 263S | | |

518b / 520b

512b ⎯ Second Test Group

| User Identifier | Cluster Identifier A | Cluster Identifier B | Super Cluster Identifier | Ad | Purchase | Conversion |
|---|---|---|---|---|---|---|
| 136 | 123A | 620B | 276S | x | x | o |
| 137 | 123A | 647B | 276S | | | |
| 138 | 118A | 647B | 276S | x | | |
| 148 | 120A | 676B | 216S | | x | o |
| 149 | 120A | 676B | 216S | | | |
| 150 | 120A | 601B | 216S | | | |

516c / 518c / 520c

514b ⎯ Second Control Group

| User Identifier | Cluster Identifier A | Cluster Identifier B | Super Cluster Identifier | Purchase | Conversion |
|---|---|---|---|---|---|
| 145 | 199A | 638B | 280S | x | |
| 146 | 138A | 638B | 280S | o | x |
| 147 | 138A | 699B | 280S | | |
| 153 | 158A | 673B | 226S | | |
| 154 | 158A | 673B | 226S | | |
| 155 | 158A | 673B | 226S | | |

CAPTURING A CLUSTER EFFECT WITH TARGETED DIGITAL-CONTENT EXPOSURES

BACKGROUND

Distributing digital content poses a unique set of challenges to tracking the connection between users' exposure to digital content and conversion actions. Such conversion actions may include the download, purchase, streaming or other consumption of an item featured in digital content. In contrast to movement in the physical world, a network user may navigate from one website to another to purchase or otherwise consume an item. Some software application interfaces offer the same navigation functionality.

Exposure to digital content is not, however, always or even often an isolated experience. A user may converse with other users concerning digital content offline. A user may also share digital content electronically sending a link (e.g., a "URL") to another user, for example. These conversations and digital-sharing events can prompt other users to purchase or otherwise consume a featured item as part of an indirect conversion action. These indirect conversion actions have proven difficult (if not impossible) for conventional conversion-tracking techniques to detect.

To track the connection between exposure to digital content and conversion actions, certain websites, applications, and other digital media have implemented some network-specific techniques. For example, some web servers use cookies for a user's web browser to track a user navigating from one digital touchpoint to another digital touchpoint. The web server may, for instance, use a cookie to assign a unique identifier to the user's browser when the browser requests a digital advertisement and then subsequently track the browser's navigation to other websites. As another example, some websites insert a transparent pixel tag into a web page and track a user's navigation from webpage to webpage. Such pixel tracking enables digital advertisers to track a user's navigation and consumption of advertised items. In some cases, application servers track in-application actions, such as purchases or reactions to posts, or track device identifiers as a user receives a digital advertisement and subsequently downloads an application or makes a purchase.

But these and other conventional conversion-tracking techniques have significant limits that fail to capture actions outside of a computer network as well as digital-sharing events that indirectly affect conversion. For instance, conventional cookies, pixel tracking, and in-application tracking do not detect conversations between network users concerning digital content. Nor do such conventional conversion-tracking techniques detect other interactions outside of the network that prompt users to consume or purchase an item featured in digital content.

Similarly, conventional conversion-tracking techniques do not track the connection between digital content displayed on a device that a user in turn shows to other users—resulting in another user's conversion action. Such conventional techniques cannot track the connection between a digital message, post, video, or other social-networking events that indirectly result in another user's conversion action. In sum, conventional conversion-tracking techniques are often user-specific and fail to capture the impact and reach that outside-network actions and digital-sharing activity have on conversion actions.

SUMMARY

This disclosure describes one or more embodiments of methods, non-transitory computer readable media, and systems that solve the foregoing problems in addition to providing other benefits. While this summary refers to systems for simplicity, the summary also applies to certain disclosed methods and non-transitory computer readable media. To solve the foregoing and other problems, the disclosed systems determine a cluster effect representing the impact that a user's digital-content exposure has on other users' conversion actions. The disclosed systems detect the downloads, purchases, or other forms of consumption of a featured item that result from users within the same cluster viewing digital content featuring the item. The systems also optionally apply the cluster effect by, for example, generating a conversion report representing the cluster effect or by providing tools that exploit the cluster effect in distributing digital content.

In some embodiments, for instance, the systems generate clusters of users, where each cluster has one or more users. The systems then separate the clusters of users into two groups—that is, a first group of clusters and a second group of clusters. The systems subsequently determine incremental lifts for different trial groups. For example, the systems determine a first incremental lift between a first test group and a first control group, where each such group comprises clusters of users from the first group of clusters. The systems also determine a second incremental lift between a second test group and a second control group, where each such group comprises individual users from the second group of clusters. By comparing the first incremental lift to the second incremental lift, the systems determine a cluster effect.

The disclosed systems overcome the limits of conventional conversion-tracking techniques. By determining an incremental lift for trial groups organized by either clusters of users or by individual users, the disclosed systems detect any differences in conversion that a digital-content delivery may have on multiple users within a cluster. Relatedly, by determining a cluster effect representing the difference between compared incremental lifts, the disclosed systems indirectly detect the influence that a user's outside-network actions may have on other users' purchases or consumption. In determining such a cluster effect, the disclosed systems indirectly detect the impact a digital message, post, digital video, or other digital-sharing activity has on converting digital-content delivery into a purchase or other form of digital consumption.

BRIEF DESCRIPTION OF THE DRAWINGS

The detailed description refers to the drawings briefly described below.

FIGS. 4, 5A, and 5B illustrate trial groups in accordance with one or more embodiments.

DETAILED DESCRIPTION

Figure 1:
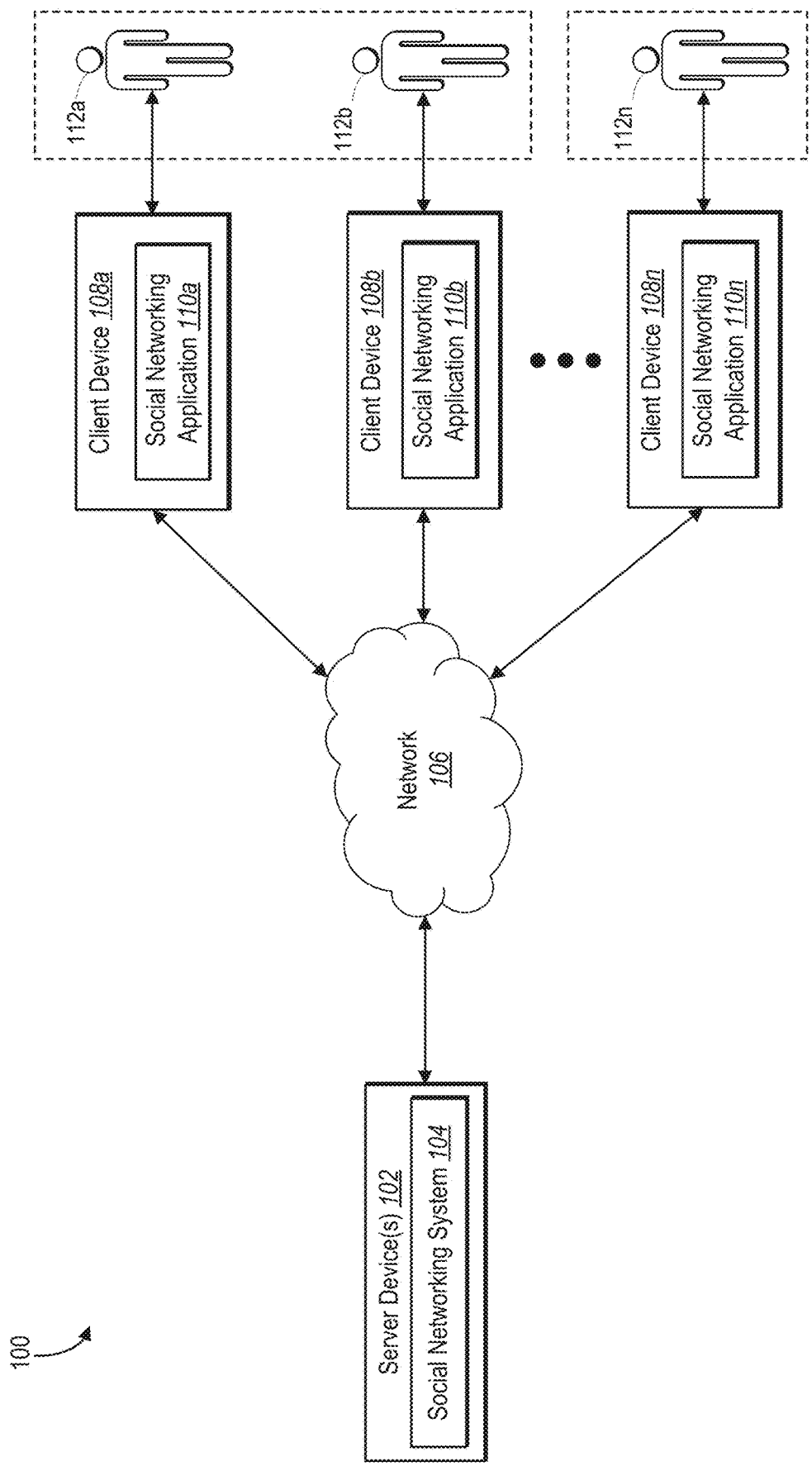
FIG. 1 illustrates a block diagram of an environment for implementing a social networking system in accordance with one or more embodiments.

This disclosure describes a social networking system that determines a cluster effect representing the impact that users' digital-content exposure has on other users' conversion actions. The disclosed social networking system detects downloads, purchases, or other forms of consumption of a featured item that result from users within the same cluster viewing digital content featuring the item. The social networking system optionally applies the cluster effect by, for example, generating a conversion report representing the cluster effect or by providing tools that exploit the cluster effect in distributing digital content. Such tools optionally adjust the distribution of digital content to users within target clusters based on the cluster effect.

In some embodiments, for instance, the social networking system generates clusters of users, where each cluster has one or more users. The social networking system then separates the clusters of users into two groups—that is, a first group of clusters and a second group of clusters. The social networking system subsequently determines incremental lifts for different trial groups. For example, the social networking system determines a first incremental lift between a first test group and a first control group, where each such group comprises clusters of users from the first group of clusters. The social networking system also determines a second incremental lift between a second test group and a second control group, where each such group comprises individual users from the second group of clusters. By comparing the first incremental lift to the second incremental lift, the social networking system determines a cluster effect.

To generate clusters of users, the social networking system optionally applies a clustering algorithm to identify clusters based on common attributes shared among users. The clustering algorithm may, for example, identify clusters of users based on designated relationships within the social networking system, commonly used Internet Protocol addresses, common device identifiers, or some other common attribute that indicates a cluster. Such common attributes indicate to the social networking system that certain users are part of a cluster, such as a household, a group of classmates, or a group of coworkers.

The clusters may include differing numbers of users. In some cases, a cluster includes multiple users that share common attributes. In other cases, a cluster includes a single user with whom the clustering algorithm has not grouped other users. Regardless of the number of users in a cluster, the clustering algorithm optionally creates such clusters by assigning each user a cluster identifier. In some such embodiments, the social networking system uses both the cluster identifier and a user identifier assigned to each user to sort users into groups. Accordingly, each user may have both a user identifier and a cluster identifier. Whereas users in the same cluster share a common cluster identifier, each user has a different user identifier.

After generating clusters of users, in some embodiments, the social networking system creates trial groups to facilitate determining incremental lift. In some cases, the incremental lift represents the difference between (a) the consumption of a featured item by users to whom the social networking system delivered digital content (e.g., a digital advertisement) and (b) the consumption of the featured item by users to whom the social networking system did not deliver the digital content. Consumption by users who viewed the digital content represents a conversion action, that is, a consumption that results from or is linked to exposure to digital content.

To create the trial groups, the social networking system sorts users into two groups by clusters. For example, the social networking system randomly sorts clusters of users into a first group and a second group for analysis. As part of that analysis, the social networking system sorts clusters from the first group into a first test group and a first control group. By contrast, the social networking system sorts users (not clusters) from the second group into a second test group and a second control group. The social networking system then delivers digital content to users in the test groups, but not to users in the control groups.

In some embodiments, the social networking system creates trial groups by sorting users according to cluster identifiers or by user identifiers. For example, in certain embodiments, the social networking system sorts users according to their cluster identifiers to form the first group and the second group, as well as to form the first test group and the first control group. By contrast, the social networking system optionally sorts users according to their user identifiers to form the second test group and the second control group.

As noted above, the social networking system uses the trial groups to determine an incremental lift for both users sorted as clusters and users sorted as users. The social networking system then compares the incremental lifts to determine a cluster effect. For example, the social networking system may measure the incremental lift between the first test group and the first control group in terms of the percentage of incremental buyers of a product in the first test group compared to buyers of the product in the first control group. Similarly, the social networking system may measure the incremental lift between the second test group and the second control group in terms of the percentage of incremental buyers of a product in the second test group compared to buyers of the product in the second control group. As explained below, the social networking system may use many other measures of incremental lift.

Regardless of the measure for incremental lift, the social networking system uses incremental lifts to determine a cluster effect. For example, the social networking system determines a cluster effect as the divergence between compared incremental lifts. That cluster effect represents the impact users with digital-content exposure have on other users in the same cluster. For example, the social networking system may determine a cluster effect as the difference between (a) the percentage of incremental buyers for the first test-and-control groups and (b) the percentage of incremental buyers for the second test-and-control groups. Again, the social networking system may use several other measures to determine a cluster effect, and the foregoing examples are merely illustrative.

In addition to determining a cluster effect, in some embodiments, the disclosed social networking system evaluates different clustering algorithms' capture of a cluster effect. As explained below, the social networking system applies different clustering algorithms to users to create both clusters of users (from one clustering algorithm) and alternative clusters of users (from another clustering algorithm). To compare the different algorithms, the social networking system sorts super clusters into trial groups, where the super clusters may include overlapping conglomerations of both clusters and alternative clusters. The social networking system then compares incremental lift attributed to clusters formed by the one clustering algorithm to incremental lift attributed to the alternative clusters formed by the other clustering algorithm. By performing this comparison, the social networking system determines how different clustering algorithms capture a cluster effect and which clustering algorithms better represent clusters, such as by identifying those algorithms that more accurately represent households, a group of coworkers, or a group of classmates.

Beyond determining a cluster effect and evaluating clustering algorithms, the disclosed social networking system also applies the determined cluster effect. For example, in some embodiments, the social networking system generates a conversion report representing the cluster effect in various metrics. Additionally, or alternatively, the social networking system provides target-cluster options that exploit the cluster effect in distributing digital content. Such tools optionally adjust the distribution of digital content to users within target clusters by location, demographic, institution, or some other variable detected as part of the cluster effect.

As noted above, the disclosed social networking system overcomes the limits of conventional conversion-tracking techniques. Pixel tracking, in-application tracking, and other conventional conversion-tracking techniques do not track the connection between a user's out-of-network conversation or digital-sharing event and another user's conversion action. By determining an incremental lift for trial groups organized by either clusters or by individual users, the disclosed social networking system detects a cluster effect, such as differences in conversion that a digital-content delivery may have on multiple users within a cluster. In addition to detecting the cluster effect, the disclosed social networking system exploits the effect by providing target-cluster options.

In addition to failing to detect a cluster effect, pixel tracking, in-application tracking, and other conventional conversion-tracking techniques do not track the connection between digital content on a single device, on the one hand, and another user's conversion action as a result of that digital content, on the other hand. By determining a cluster effect representing the divergence between compared incremental lifts, the disclosed system detects the influence digital content on one device may have on multiple users in terms of conversion actions. Relatedly, by determining and applying the cluster effect, the social networking system further detects and exploits the influence an in-person conversation or social-networking activity has on converting digital-content delivery into a purchase or other form of digital consumption.

Turning now to the figures, FIG. 1 illustrates a block diagram of one embodiment of a system environment 100 in which a social networking system 104 operates. As illustrated in FIG. 1, the system environment 100 includes server device(s) 102, which include the social networking system 104. The system environment 100 further includes client devices 108a, 108b, through 108n. As depicted in FIG. 1, each of the client devices 108a-108n have an associated user—with a user 112a associated with the client device 108a, a user 112b associated with the client device 108b, and a user 112n associated with the client device 108n. The users 112a-112n may be humans, organizations, organization members, or any other entities. Although FIG. 1 illustrates a particular number of client devices 108a-108n and a respective number of associated users 112a-112n, the system environment 100 may include any number of client devices and any number of users. Indeed, in some embodiments, the client device 108a-108n and the users 112a-112n correspond to thousands, millions, or billions of users.

As illustrated in FIG. 1, the client devices 108a-108n can communicate with the server device(s) 102, including the social networking system 104, over a network 106. This disclosure describes additional details related to the social networking system 104 below with reference to FIGS. 8-9. In addition, the network 106 may represent a network or a collection of networks, such as the Internet, a corporate intranet, a local area network ("LAN"), or a combination of two or more such networks. The network 106 may be any suitable network over which the client devices 108a-108n (or other components) access the social networking system 104 (or vice versa), as described further below with reference to FIG. 8.

As described below, the server device(s) 102 can enable the various functions, features, processes, methods, and systems described herein using, for example, the social networking system 104. Additionally, or alternatively, the server device(s) 102 coordinate with the client devices 108a-108n to perform or provide the various functions, features, processes, methods, and systems described in more detail below. Although FIG. 1 illustrates a particular arrangement of the server device(s) 102, social networking system 104, network 106, and client devices 108a-108n, various additional arrangements are possible. For example, the social networking system 104 and the server device(s) 102 may directly communicate with the client devices 108a-108n and thus bypass the network 106.

Generally, the client devices 108a-108n can include any one of various types of client devices. For example, the client devices 108a-108n can include a mobile device (e.g., a smart phone), tablet, laptop computer, desktop computer, television, or any other type of computing device as further explained below with reference to FIG. 8. Additionally, the server device(s) 102 can include one or more computing devices including those explained below with reference to FIG. 8. The server device(s) 102, social networking system 104, network 106, and client devices 108a-108n may communicate using any communication platforms and technologies suitable for transporting data and/or communication signals, including any known communication technologies, devices, media, and protocols supportive of data communications, examples of which are described below with reference to FIG. 9.

As shown in FIG. 1, the server device(s) 102 provide the client devices 108a-108n access to the social networking system 104 through the network 106. In one or more embodiments, by accessing the social networking system 104, the client devices 108a-108n send or receive one or more digital content (e.g., posts, instant messages, comments) to or from the social networking system 104, including digital advertisements that feature a product. The social networking system 104 can provide, for example, a website that enables one of the users 112a-112n to receive, post, purchase, send, or perform other actions with respect to digital content within the social networking system 104.

Alternatively, the client devices 108a-108n communicate with the social networking system 104 via a dedicated application on the client devices 108a-108n. In particular, and as further shown in FIG. 1, each of the client devices 108a-108n has an associated social networking application—with a social networking application 110a associated with the client device 108a, a social networking application 110b associated with the client device 108b, and a social networking application 110*n* associated with the client device 108*n*. In some instances, the social networking system 104 provides data packets comprising the social networking applications 110*a*-110*n* to the client devices 108*a*-108*n*, respectively (e.g., by providing data to a mobile device that, when executed, creates a software application on the client devices 108*a*-108*n*).

In some embodiments, the social networking application 110*a*, for instance, comprises a web browser, applet, or other software application (e.g., a native application) available to the client device 108*a*. The client device 108*a* may launch the social networking application 110*a* to facilitate interacting with the social networking system 104. For example, the social networking application 110*a* may coordinate communications between the client device 108*a* and the server device(s) 102 that, for example, access webpages of the social networking system 104 or send digital content within the system 104. To facilitate user interaction with the social networking system 104, the social networking application 110*a* provides a graphical user interface of the social networking system 104; receives indications of interactions of the user 112*a* with the graphical user interface; and performs various requests, queries, or responses to other user input. Although this paragraph uses the social networking application 110*a* as an example, the social networking applications 110*b*-110*n* may comprise the same components and perform the same functions as those included and performed by the social networking application 110*a*.

As an overview of the social networking system 104, the system 104 generates clusters to determine a cluster effect based on the actions and interactions performed—and profile information entered—by the users 112*a*-112*n*. For example, in some embodiments, the social networking system 104 generates clusters of users as part of determining a cluster effect. As used in this disclosure, the term "cluster" refers to a grouping of one or more users of the social networking system 104. In some instances, a cluster includes a single user, such as a single user who lacks certain common attributes with other users as determined by a clustering algorithm. As shown in FIG. 1, for example, a dotted box surrounding the user 112*n* indicates that the user 112*n* is a single user within a cluster. In some instances, however, a cluster includes multiple users having one or more common attributes. As shown in FIG. 1, for example, a dotted box surrounding the users 112*a* and 112*b* indicates that the users 112*a* and 112*b* are part of a cluster.

Common attributes may include, but are not limited to, an affinity coefficient, a designated relationship, a commonly used Internet Protocol ("IP") address, a common physical address, a common device identifier, tagged users within one or more shared images, a common employer, or a common educational institution. Such information may be entered as profile information for one or more of the users 112*a*-112*n*. Accordingly, and by way of example, a cluster may include a group of alumni from the same educational institution, classmates from the same class or educational institution, club members from the same club, coworkers who share a same employer or joint venture, social-network friends who are associated by affinity coefficient, household members who are part of a household or live at a same location, or neighbors who live within proximity of each other (e.g., with physical addresses on the same street or same neighborhood).

The term "cluster effect" refers to the impact that one or more users' exposure to digital content has on conversion actions by other users in the same cluster. The term "conversion action" in turn refers to a targeted action a user performs in response to digital content. The targeted action may come in response to a digital advertisement or product placement within digital content. For example, a cluster effect includes the purchase or consumption of a product by a first household member as a consequence of the first household member showing a second household member a digital advertisement. Alternatively, the first household member may have sent a direct message to the second user, posted or streamed a digital video that the second user viewed, spoken to the second user, or performed some other activity that prompted the second user to purchase or consume the product.

As used in this disclosure, a cluster effect includes various forms of conversion actions, including, but not limited to, downloading a software application, viewing digital content, voting in an election (e.g., for a particular candidate), purchasing a product, or subscribing to a service (e.g., subscribing to access digital content, download a podcast, or receive a food basket). Accordingly, a cluster effect accounts for a conversion action by a first cluster member as a consequence of showing or otherwise sharing with a second cluster member digital content intended to promote the conversion action.

To determine such a cluster effect, the social networking system 104 creates various groups based on clusters of the users 112*a*-112*n*. For example, the social networking system 104 sorts clusters of the users 112*a*-112*n* into a first group and a second group. The social networking system 104 then sorts clusters from the first group into a first test group and a first control group. By contrast, the social networking system 104 sorts users from the second group into a second test group and a second control group. In other words, the social networking system 104 sorts users from the first group by cluster and users from the second group by user.

As used in this disclosure, the term "test group" refers to a group of users who receive certain digital content from the social networking system 104. In other words, the digital content serves as the variable that the social networking system 104 tests. For example, the social networking system 104 may add a digital advertisement into a newsfeed viewed by users in a test group.

In contrast to a test group, the term "control group" refers to a group of users who do not receive certain digital content or at least do not receive certain digital content from the social networking system 104. In other words, users in a control group serve as a benchmark against which the effectiveness of digital content is measured by the social networking system 104. Relatedly, the term "trial group" refers to a group separated from a sample of users. A trial group includes, but is not limited to, a first group, second group, first test group, first control group, second test group, or second control group.

Continuing the overview, after creating the test groups and control groups, the social networking system 104 determines an incremental lift between respective test and control groups. As used in this disclosure, the term "incremental lift" refers to the difference between the consumption or purchase by a test group of a featured item and the consumption or purchase by a control group of the featured item. For example, in some embodiments, an incremental lift represents the difference between (a) downloads by a test group of an advertised software application and (b) downloads by a control group of an advertised software application. As explained below in connection with FIG. 3A, the social networking system 104 measures incremental lift in a variety of forms.

Regardless of the form of measurement, the social networking system 104 compares incremental lifts to determine a cluster effect. For example, the social networking system 104 may compare (1) a first incremental lift between a first test group and a first control group to (2) a second incremental lift between a second test group and a second control group to determine a cluster effect. In some such embodiments, the cluster effect represents the divergence between the first incremental lift and the second incremental lift. In one such measurement, the social networking system 104 determines a cluster effect measured in terms of a percentage representing an incremental number of users who consumed or purchased an item as shown in the first incremental lift above or below the second incremental lift.

Figure 2:
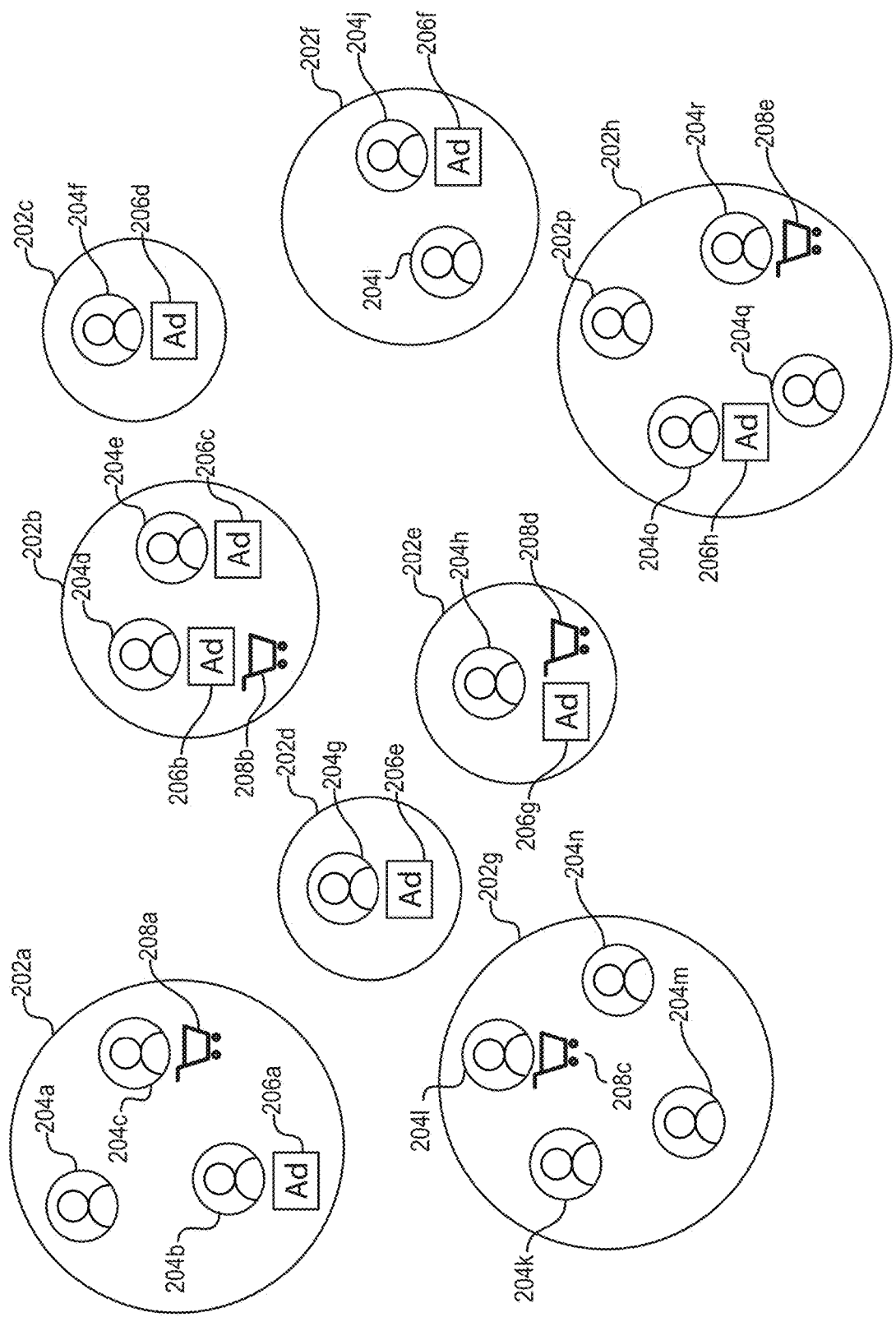
FIG. 2 illustrates a conceptual diagram of a cluster effect in accordance with one or more embodiments.

Turning now to FIG. 2, this figure illustrates a conceptual diagram of a cluster effect. As shown in FIG. 2, this particular cluster effect represents the impact that certain users' exposure to a digital advertisement has on other users within the same clusters as measured in conversion actions. Specifically, the cluster effect depicted in FIG. 2 represents the additional purchases of an advertised product by some users that result from certain other users' exposure to a digital advertisement.

As shown in FIG. 2, the social networking system 104 groups users 204a-204r into clusters 202a-202h. The clusters 202a, 202b, 202f, 202g, and 202h each include multiple users. In particular, the cluster 202a includes the users 204a, 204b, and 204c; the cluster 202b includes the users 204d and 204e; the cluster 202f includes the users 204i and 204j; the cluster 202g includes the users 204k, 204l, 204m, and 204n; and the cluster 202h includes the users 204o, 204p, 204q, and 2044. By contrast, the clusters 202c, 202d, and 202e each include a single user. In particular, the clusters 202c, 202d, and 202e respectively include the users 204f, 204g, and 204h.

For illustrative purposes, the clusters 202a-202h represent different households. Accordingly, the clusters 202a-202h represent an estimate by the social networking system 104 of which users form a household. Other forms of clusters could be used as well to demonstrate clusters, such as social-network friends, neighbors, or organizational members.

As further shown in FIG. 2, the social networking system 104 delivers digital advertisements 206a, 206b, 206c, 206d, 206e, 206f, 206g, and 206h to the users 204b, 204d, 204e, 204f, 204g, 204h, 204j and 204o, respectively. The digital advertisements 206a-206h represent different instances of the same digital advertisement that advertises a product. The social networking system 104 delivers the digital advertisements 206a-206h as a post within a newsfeed to client devices associated with the users 204b, 204d, 204e, 204f, 204g, 204h, 204j and 204o. The digital advertisements 206a-206h may or may not prompt a user to purchase the advertised product. For example, the digital advertisements 206b and 206g prompt the users 204d and 204h to respectively make purchases 208b and 208d of the advertised product. By contrast, the digital advertisements 206d, 206e, and 206f do not prompt the users 204f, 204g, and 204j to make purchases of the advertised product.

Other purchases in FIG. 2 illustrate the cluster effect. The digital advertisements 206a and 206h indirectly prompt the users 204c and 204r to make purchases 208a and 208e of the advertised product. As illustrated in FIG. 2, the social networking system 104 delivers the digital advertisements 206a and 206h to the users 204b and 204o. The users 204b and 204o in turn perform some activity—such as speaking with a household member, sending a direct message, or posting or streaming a digital video—that prompts the users 204c and 204r to make the purchases 208a and 208e.

As further shown in FIG. 2, the purchases 208a and 208e are the result of a cluster effect. In particular, the purchases 208a and 208e represent incremental purchases that one cluster member's exposure to digital content prompted another cluster member to make. As noted above, conventional conversion-tracking techniques cannot detect such a cluster effect. But the disclosed social networking system 104 performs an innovative technique for detecting such a cluster effect.

Figure 3A:
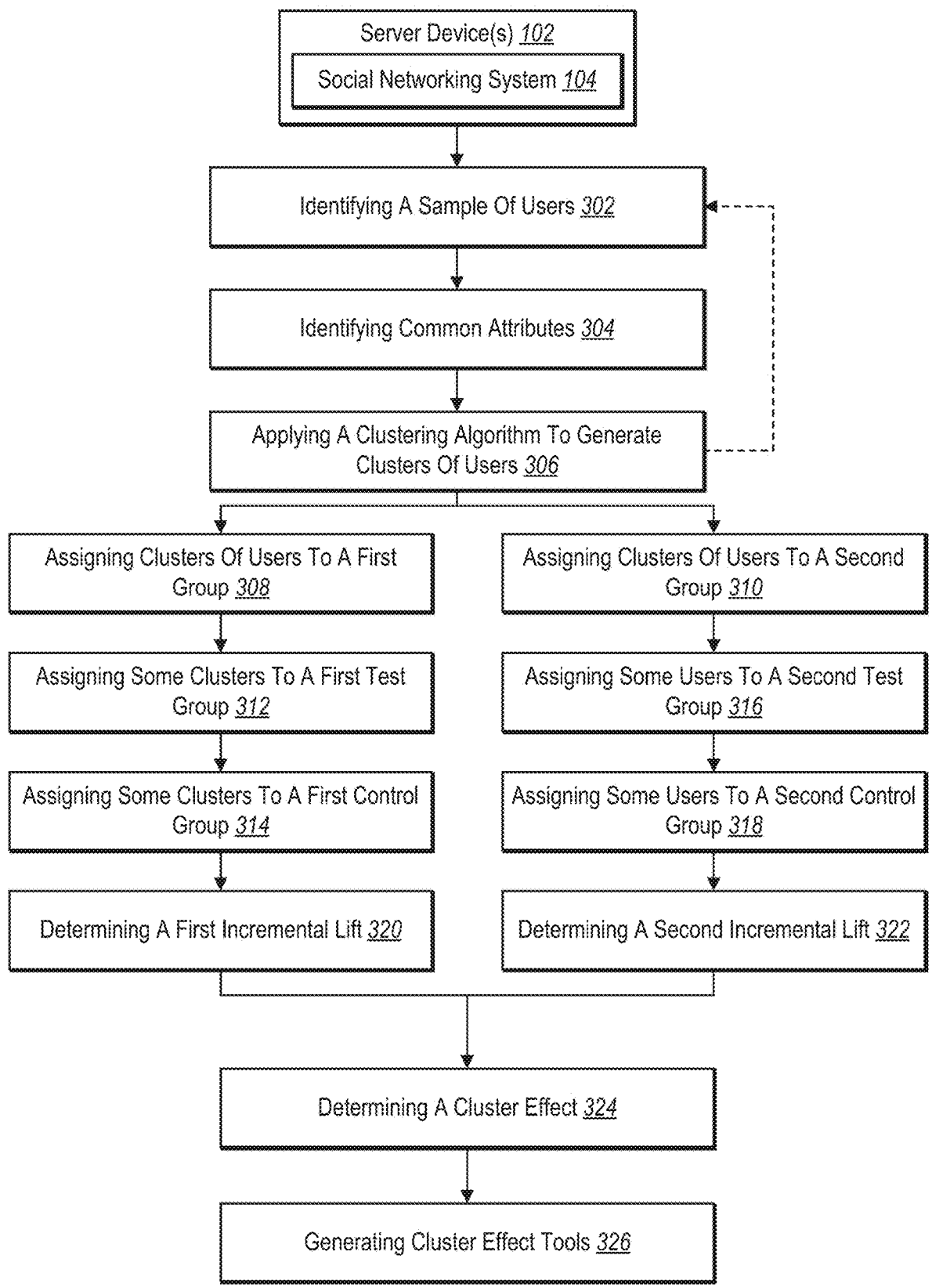
FIGS. 3A-3B illustrate sequence-flow diagrams of determining a cluster effect representing the impact of users' exposure to digital content on other users' conversion actions in accordance with one or more embodiments.
Figure 3B:
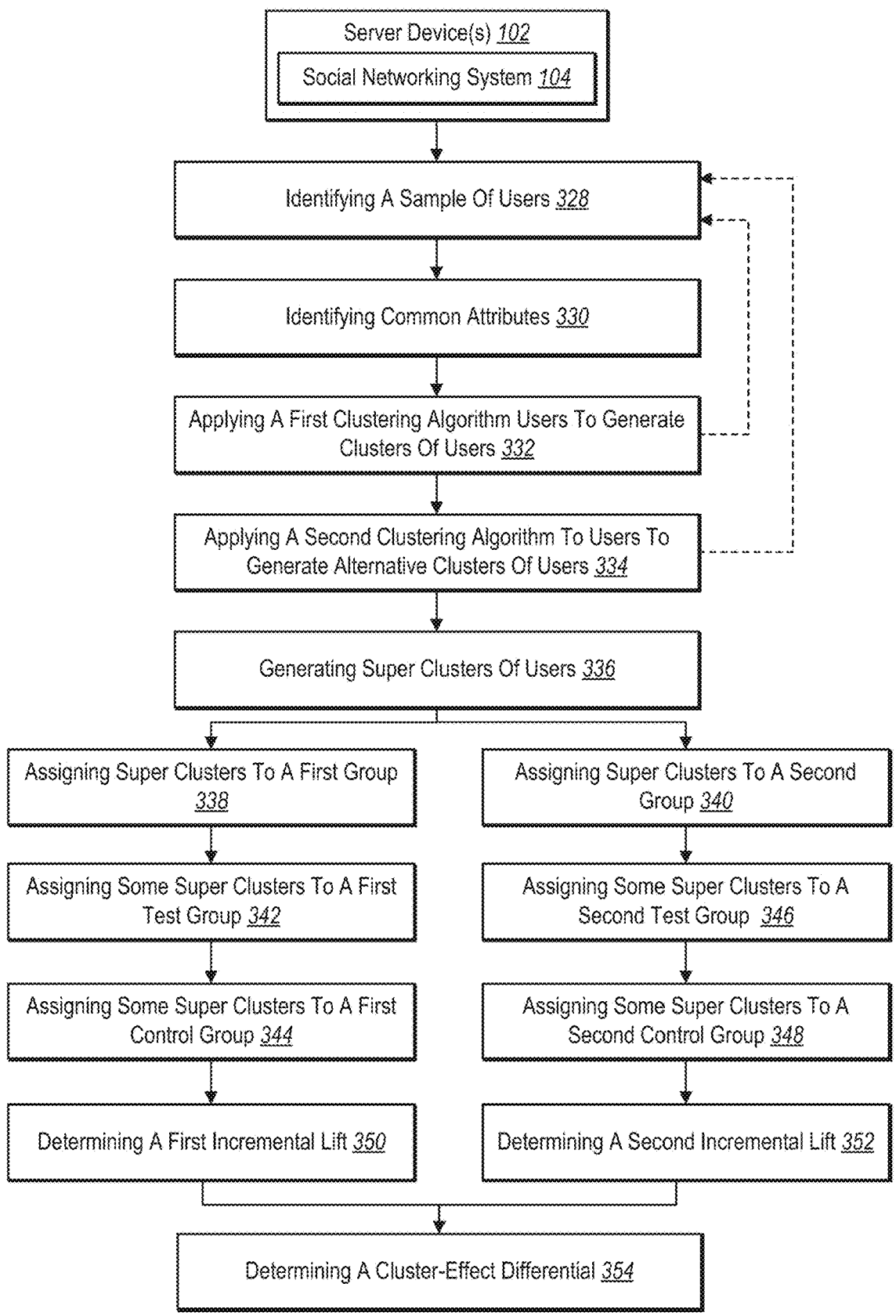

Turning now to FIGS. 3A and 3B, these figures provide an overview of embodiments of the social networking system 104 that determine a cluster effect representing the impact of users' exposure to digital content on other users' conversion actions. Specifically, FIG. 3A illustrates a sequence of acts 302-326 that the social networking system 104 performs to determine and apply a cluster effect, such as identifying a sample of users, applying a clustering algorithm, determining a cluster effect, and generating cluster effect tools. FIG. 3B illustrates a sequence of acts 328-354 that the social networking system 104 performs to compare different clustering algorithms, such as identifying a sample of users, generating super clusters of users, and determining a cluster-effect differential.

Various components of the system environment 100 perform the acts 302-326 shown in FIG. 3A or the acts 328-354 shown in FIG. 3B. In some embodiments, for example, the social networking system 104 comprises computer-executable instructions that cause the server device(s) 102 to perform one or more of the acts 302-326 or the acts 328-354. Rather than repeatedly describe the instructions within the social networking system 104 as causing the server device(s) 102 to perform certain acts, this disclosure primarily describes the social networking system 104 as performing the acts 302-326 or the acts 328-354 as a shorthand for those relationships.

Turning back now to FIG. 3A, as shown, the social networking system 104 performs the act of identifying a sample of users. The social networking system 104 selects a sample of users using a variety of methods. In some embodiments, the social networking system 104 randomly identifies users until it has identified a statistically significant number of users to create multiple test-and-control groups. Additionally, or alternatively, the social networking system 104 identifiers users from within the social networking system 104 that comprise a representative sample of a target population (e.g., a representative demographic of a population in a target location).

When identifying a sample of users, the social networking system 104 optionally uses a target variance as a benchmark for identifying an adequate number of users to estimate a cluster effect. Additionally, or alternatively, the social networking system 104 optionally uses a confidence level to estimate the accuracy of results derived from the sample of users. Regardless of whether a target variance or confidence level is used, the social networking system 104 may use any well-known statistical sample equation to identify a sample of users within the system 104, such as equations for estimation of a proportion, estimation of a mean, and stratified sample size.

In addition to identifying a sample of users, the social networking system 104 performs the act 304 of identifying common attributes from among the sample. The social networking system 104 identifies these common attributes from actions taken and information entered in the social networking system 104 by the users 112a-112n. For example, in some embodiments, the social networking system 104 identifies one or more of designated relationships, common physical addresses, common employers, and/or common educational institutions in profile information associated with the sample of users. Additionally, or alternatively, the social networking system 104 identifies an IP address or device identifier used by two or more of users from the sample to access the social networking system 104. The social networking system 104 also optionally identifies images, posts, or comments in which two or more of the users from the sample have been tagged or identifies groups which two or more of the users from the sample have joined.

In some embodiments, the social networking system 104 determines an affinity coefficient for some (or all) of the in the sample relative to each other as part of identifying common attributes. The social networking system 104 determines the affinity coefficient based on a social graph. In some embodiments, the affinity coefficient represents a strength of a relationship between a first user and a second user (e.g., users 112a and 112b). The affinity coefficient may also represent a probability or function that measures a probability that a first user and a second user are part of a same cluster (e.g., a group of social-network friends). In other words, the affinity coefficient may represent a strength of relationship between a user and a proposed cluster.

In some embodiments, the social networking system 104 generates or utilizes an affinity coefficient by quantifying an affinity between a first user and a second user-both of whom are represented as objects within a social graph. Specifically, within the social graph, the social networking system 104 represents each of the users 112a and 112b as a node. The social networking system 104 likewise represents various other users and objects associated with the users 112a and 112b as nodes within the social graph and connections among the user nodes and object nodes as edges within the social graph. The social graph may represent any of the common attributes noted above as a node. By using these nodes and edges, the social networking system 104 generates an affinity coefficient for any two users or between any user and a proposed cluster. As explained below, the social networking system 104 may group users within a cluster when they have an affinity coefficient above a threshold. This disclosure describes affinity coefficients in more detail with reference to FIG. 10 below.

As further shown in FIG. 3A, the social networking system 104 performs the act 306 of applying a clustering algorithm to users of the social networking system 104 to generate clusters of users. In some embodiments, the social networking system 104 applies the clustering algorithm to the sample of users identified as part of the act 302. By contrast, in some embodiments, the social networking system 104 applies the clustering algorithm as part of identifying the sample of users. In some such embodiments, the social networking system 104 applies the clustering algorithm to generate clusters to ensure that the sample of users does not split up users who are part of a same cluster—within or without the sample of users. To illustrate this relationship between identifying a sample of users and applying a clustering algorithm, FIG. 3A includes a dotted arrow from the act 306 to the act 302.

When generating the clusters of users, the social networking system 104 may apply a variety of clustering algorithms. For example, in some embodiments, the social networking system 104 applies an affinity-propagation algorithm, a centroid-based clustering algorithm, a distribution-based clustering algorithm, or a density-based clustering algorithm. In particular, in some embodiments, the social networking system 104 applies any one of the methods or algorithms described by Jure Leskovec, Anand Rajaraman, and Jeffrey David Ullman, Ch. 10, "Mining Social-Network Graphs" in Mining of Massive Datasets 325-383 (2014) (hereinafter "Leskovec"), which is incorporated by reference in its entirety. In some such embodiments, the social networking system 104 uses a clustering algorithm that includes hash functions. For example, the social networking system 104 optionally applies MapReduce or the Flajolet-Martin technique when generating clusters of users, as described in Leskovec.

Additionally, or alternatively, in some embodiments, the social networking system 104 applies the clustering algorithm described by Nina Mishra, Robert Schreiber, Isabelle Stanton, and Robert E. Tarjan, "Finding Strongly Knit Clusters in Social Networks," Internet Mathematics Vol. 5, No. 1-2: 153-172 (2009) (hereinafter "Mishra"), which is incorporated by reference in its entirety. Whether applying Mishra's clustering algorithm or some other clustering algorithm, the social networking system 104 optionally uses affinity coefficients as part of the clustering algorithm to generate clusters of users. In some such embodiments, the social networking system 104 determines an affinity coefficient for a user relative to a proposed cluster. For example, in some embodiments, the social networking system 104 proposes a set of possible clusters based on common attributes detected within the social networking system 104. The social networking system 104 groups users into clusters based on an overall affinity coefficient among users (from a sample of users) to generate clusters of users. In one implementation, the social networking system 104 uses affinities as described in Mishra.

Regardless of the clustering algorithm, in some embodiments, the social networking system 104 generates clusters by assigning each user a cluster identifier. In other words, the social networking system 104 assigns a cluster identifier to each user representing the cluster in which the clustering algorithm determines the user belongs. The term "cluster identifier" refers to a code, combination, number, or other identifier for a particular cluster. A cluster identifier differs from a user identifier. The term "user identifier" refers to a code, combination, number, or other identifier for a particular user. As explained below, the social networking system 104 optionally uses both cluster identifiers and user identifiers to sort users into groups. In some embodiments, the social networking system 104 assigns each of the users 112a-112n a user identifier (e.g., assigning each user a unique user identifier upon opening an account in the social networking system 104). Accordingly, after applying a clustering algorithm, each user may have both a user identifier and a cluster identifier. FIGS. 4A and 4B provide examples of cluster identifiers and user identifiers.

As further shown in FIG. 3A, after applying a clustering algorithm, the social networking system 104 performs the act 308 of assigning clusters of users to a first group and the act 310 of assigning clusters of users to a second group. For example, in some embodiments, the social networking system 104 randomly assigns clusters to the first group and the second group of clusters. To make that random assignment, the social networking system 104 optionally uses cluster identifiers to randomly sort the clusters of users into the first group or the second group. Accordingly, the social networking system 104 may randomly assign clusters of users to groups according to cluster identifiers.

Alternatively, in some embodiments, the social networking system 104 divides the clusters of users into the first and the second groups. For example, the social networking system 104 may divide the clusters of users such that a certain portion of the clusters are in the first group and a certain portion of the clusters are in the second group (e.g., evenly dividing the clusters of users into the first and second groups).

After sorting the clusters of users into the first and second groups, the social networking system 104 further sorts the users from each of the first and second groups into test-and-control groups. As shown in FIG. 3A, for instance, the social networking system 104 performs the act 312 of assigning some clusters to a first test group and the act 314 of assigning some clusters to a first control group. For example, the social networking system 104 may randomly assign particular clusters from the first group to the first test group or to the first control group according to cluster identifiers. In other words, the social networking system 104 randomly sorts the cluster identifiers assigned to each user having the same cluster identifier into either the first test group or the first control group. By sorting users according to cluster identifier, the social networking system 104 ensures that it does not split up users within a same cluster into a different group. Accordingly, when performing the acts 312 and 314, the social networking system 104 avoids splitting one cluster member in a test group and another cluster member in a control group (or vice versa).

Alternatively, the social networking system 104 divides the clusters from the first group into a certain portion of clusters for the first test group and a certain portion of clusters for the first control group. For example, the social networking system 104 may divide the clusters from the first group evenly into the first test group and the first control group. Similarly, the social networking system 104 may divide the clusters from the first group into some other predetermined portions (e.g., two thirds in the first test group and one third in the second test group).

As further shown in FIG. 3A, the social networking system 104 performs the act 316 of assigning some users to a second test group and the act 318 of assigning some users to a second control group. For example, the social networking system 104 may randomly assign users from the second group to the second test group or to the second control group according to user identifiers. In other words, the social networking system 104 randomly sorts the user identifiers assigned to each user into either the second test group or the second control group. By sorting users according to user identifier, the social networking system 104 potentially splits users belonging to a same cluster into different groups (e.g., by splitting one cluster member in a test group and another cluster member in a control group).

Alternatively, the social networking system 104 divides the users from the second group into a certain portion of users for the second test group and a certain portion of users for the second control group. For example, the social networking system 104 may divide the users from the second group evenly into the second test group and the second control group or, alternatively, into some other predetermined portions.

After sorting users into test-and-control groups, the social networking system 104 performs the act 320 of determining a first incremental lift and the act 322 of determining a second incremental lift. As suggested above, the social networking system 104 delivers digital content to the first test group and to the second test group, but not to the first control group and not to the second control group. After delivering digital content to the test groups, the social networking system 104 determines which users within each of the test-and-control groups performed a conversion action, such as by downloading an advertised software application, purchasing an advertised product, streaming advertised digital content, or performing some other conversion action. This determination enables the social networking system 104 to in turn determine an incremental lift.

The social networking system 104 uses a variety of tools to determine which users performed a conversion action. For example, in some embodiments, the social networking system 104 generates a unique audience pixel for a website to securely track a user who visits a website and also visits webpages of the social networking system 104. In some such embodiments, the social networking system 104 generates the unique audience pixel for a website administrator to add to the header code of a particular webpage for subsequent tracking. Additionally, or alternatively, the social networking system 104 generates a conversion pixel for addition to the HTML of a target webpage. For example the social networking system 104 generates a snippet of code for adding to the HTML of a purchase-confirmation webpage for an advertised item or a streaming-webpage for an advertised video. When a conversion action occurs, the conversion pixel sends a signal to the social networking system 104 indicating that the conversion action has occurred.

Additionally, in some embodiments, the social networking system 104 receives point-of-sale or point-of-transaction data from a third party who advertised a particular product to determine which users performed a conversion action. For example, the social networking system 104 optionally receives information from the third party concerning people who downloaded a software application, viewed digital content, purchased a product, subscribed to a service, or performed some other conversion action. The social networking system 104 then matches the information concerning people who performed a conversion action with profile or other information for users within the test-and-control groups.

While this disclosure describes audience pixels, conversion pixels, and point-of-transaction data, the social networking system 104 may determine which users performed conversion actions using any suitable method. Regardless of the method used, the social networking system 104 gathers information concerning the conversion actions. For example, the social networking system 104 gathers one or more of an amount spent by a user from the sample for an individual conversion action, a number of users from the sample who performed a conversion action, a total amount spent for conversion actions performed by users within the sample, and a total number of conversion actions performed by users within the sample. Additionally, the social networking system 104 optionally gathers such data and quantifies the data for each test and control group.

Using data concerning users' conversion actions, the social networking system 104 determines a first incremental lift between users in the first test group and the first control group. Similarly, the social networking system 104 determines a second incremental lift between users in the second test group and the second control group. The social networking system 104 determines incremental lift in a variety of measurements.

Figure 6:
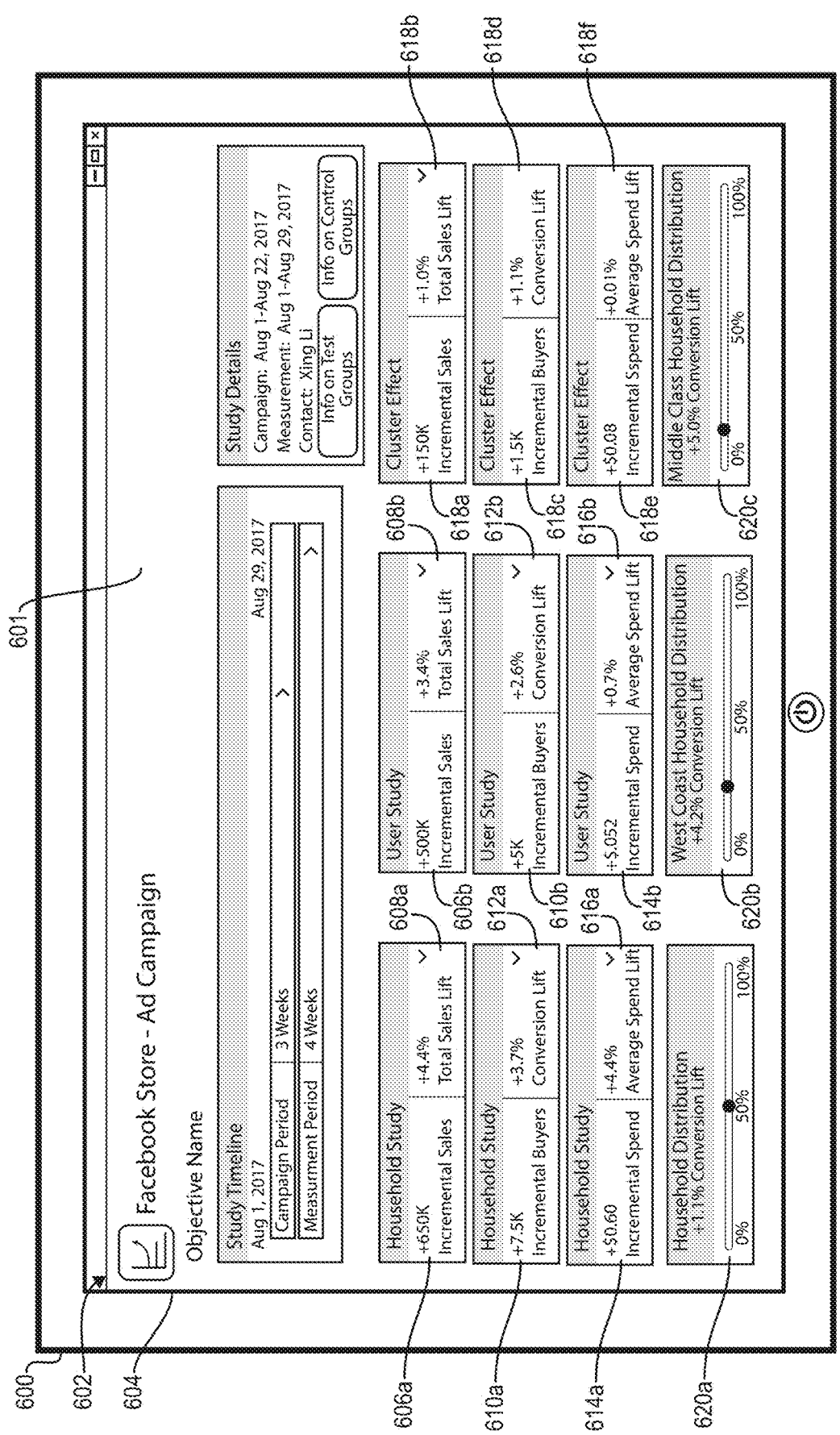
FIG. 6 illustrates a user interface of a client device presenting a conversion report and target-cluster options in accordance with one or more embodiments.

For example, in some instances, the social networking system 104 determines incremental lift in terms of (a) an incremental amount spent per user in a test group above or below the same measurement type in a control group, (b) a percentage representing an incremental amount spent per user in a test group above or below the same measurement type in a control group, (c) an incremental number of users who consumed or purchased an item in a test group above or below the same measurement type in a control group, (d) a percentage representing an incremental number of users who consumed or purchased an item in a test group above or below the same measurement type in a control group, (e) an incremental amount of sales generated by a test group above or below the same measurement type in a control group, and (f) a percentage representing an incremental amount of sales generated by a test group above or below the same measurement type in a control group. For simplicity, this disclosure refers to the foregoing measurements as (a) incremental-spend-amount lift, (b) average-spend lift, (c) incremental-consumption lift, (d) conversion lift, (e) incremental-sales lift, and (f) total-sales lift. FIG. 6 below provides an example of incremental lift determined in measurements (a) through (f). While this disclosure describes and refers to incremental lift in terms of measurements (a) through (f), the social networking system 104 additionally or alternatively determines incremental lift in other measurements (e.g., an incremental number of users who voted in an election or for a particular candidate, an incremental number of subscriptions for a service).

As further shown in FIG. 3A, after determining first and second incremental lifts, the social networking system 104 performs the act 324 of determining a cluster effect. To determine the cluster effect, the social networking system 104 compares the first incremental lift to the second incremental lift. In some embodiments, the social networking system 104 determines the cluster effect by determining a divergence between the first incremental lift and the second incremental lift.

Because the first incremental lift captures incremental lift between test-and-control groups separated by clusters, the first incremental lift includes incremental consumption or purchase caused by a cluster effect. Conversely, because the second incremental lift captures incremental lift between test-and-control groups separated by users, the second incremental lift does not include incremental consumption or purchase caused by a cluster effect. Accordingly, by comparing the first incremental lift to the second incremental lift, the social networking system 104 determines a measurement of the cluster effect.

For example, in some embodiments, the social networking system 104 determines a cluster effect measured in terms of conversion lifts represented by the first incremental lift and the second incremental lift. By comparing the two conversion lifts, the social networking system 104 determines a percentage representing an incremental number of users who consumed or purchased an item as shown in the first incremental lift above or below the second incremental lift. While this example highlights conversion lift, the social networking system 104 may use incremental lifts in any of the measurements (a) through (f)—or other suitable measurements—to determine a cluster effect. As described below, FIG. 6 provides additional examples.

As further shown in FIG. 3A, after determining a cluster effect, the social networking system 104 performs the act 326 of generating cluster effect tools. As suggested above, in some embodiments, the social networking system 104 provides cluster effect tools as one or both of conversion reports and target-cluster options. For example, the social networking system 104 generates a conversion report that includes a representation of the cluster effect and/or target-cluster options. After generation, the social networking system 104 provides the conversion report to a client device for presentation within a graphical user interface.

The conversion report may represent the cluster effect in terms of comparison of any of the measurements (a) through (f). Additionally, the conversion report optionally represents the cluster effect in more specific portions of a cluster. For instance, the conversion report may include a cluster effect for a particular age group, gender, location, relationship status, region, religion, or other demographic. Additionally, or alternatively, the conversion report may include a cluster effect for a particular time frame (e.g., time intervals between exposure to digital content and a corresponding conversion action).

Similarly, in some embodiments, the target-cluster options include selectable options that (upon selection) adjust the distribution of digital content to users within particular clusters. For example, the social networking system 104 may provide target-cluster options that increase or decrease the distribution of digital content to users within particular clusters, such as a video or digital advertisement. The social networking system 104 may, for instance, increase or decrease the distribution of digital content to users within clusters comprising multiple users or to users within clusters of a particular age group, gender, location, relationship status, region, religion, or other demographic. Accordingly, in some cases, the target-cluster options provide options to exploit information provided in the conversion report.

In addition to determining a cluster effect, in certain embodiments, the social networking system 104 compares different clustering algorithms to determine which clustering algorithm better or more accurately captures a cluster effect. In some cases, the social networking system 104 compares different clustering algorithms to determine which clustering algorithm generates clusters that reflect real-world clusters more accurately than the other clustering algorithm. Additionally, or alternatively, the social networking system 104 determines which of two or more clustering algorithms captures an increased cluster effect—that is, the clustering algorithm that captures a larger or more pronounced cluster effect. This disclosure describes some embodiments that compare clustering algorithms below with reference to FIG. 3B. But the social networking system 104 sometimes runs different iterations of the acts 302-326 to compare clustering algorithms.

In some embodiments, for instance, the social networking system 104 runs one iteration of the acts 302-326 with a first clustering algorithm and another iteration of the acts 302-326 with a second clustering algorithm. The social networking system 104 then compares the cluster effect determined in each iteration. In making that comparison, the social networking system 104 can make various determinations. The social networking system 104 may determine which of the clustering algorithms captures a larger cluster effect. Alternatively, by running several iterations with two different clustering algorithms, the social networking system 104 may determine which of the clustering algorithms captures a more consistent cluster effect (e.g., a cluster effect within a threshold range or statistically significant range). The social networking system 104 may similarly run iterations of the acts 302-326 with a different clustering algorithm in each iteration or different clustering algorithms in multiple iterations (e.g., three or four clustering algorithms with several iterations each).

As an illustrative example, in one or more embodiments, the social networking system 104 applies an alternative clustering algorithm to generate alternative clusters of users, where each alternative cluster has one or more users. This alternative clustering algorithm is a different clustering algorithm than the social networking system 104 used in an initial iteration or in several prior iterations. The social networking system 104 then separates the alternative clusters of users into two groups—that is, an alternative first group of clusters and an alternative second group of clusters.

The social networking system 104 subsequently determines incremental lifts for different trial groups. For example, the social networking system 104 determines an alternative first incremental lift between an alternative first test group and an alternative first control group, where each such group comprises alternative clusters of users from the first group of clusters. The social networking system 104 also determines an alternative second incremental lift between an alternative second test group and an alternative second control group, where each such group comprises individual users from the alternative second group of clusters. By comparing the alternative first incremental lift to the alternative second incremental lift, the social networking system 104 determines an alternative cluster effect. Based on a comparison of a cluster effect determined using an initial clustering algorithm and the alternative cluster effect determine using the alternative clustering algorithm, the social networking system 104 identifies either the initial clustering algorithm or the alternative clustering algorithm as generating clusters that capture a larger cluster effect.

Turning back now to FIG. 3B, this figure illustrates a representation of a sequence of acts 328-354 that the social networking system 104 performs in addition (or in the alternative) to the acts 302-326 shown in FIG. 3A. As additional or alternative acts, FIG. 3B illustrates the social networking system 104 comparing different clustering algorithms' capture of a cluster effect. By performing this comparison, the social networking system 104 determines how different clustering algorithms capture a cluster effect and which clustering algorithms better represent clusters.

As shown in FIG. 3B, the social networking system 104 performs the act 328 of identifying a sample of users and the act 330 of identifying common attributes. As suggested by their descriptions in the figures, the acts 328 and 330 in FIG. 3B respectively correspond to the acts 302 and 304 in FIG. 3A. Accordingly, the description and embodiments set forth above for the acts 302 and 304 respectively apply to the acts 328 and 330—except that the latter acts involve optionally involve applying different clustering algorithms as part of identifying a sample of users.

As further shown in FIG. 3B, the social networking system 104 performs the act 332 of applying a first clustering algorithm to users to generate clusters of users and the act 334 of applying a second clustering algorithm to users to generate alternative clusters of users. For purposes of comparison, the social networking system 104 applies the first and second clustering algorithms to the same group of users. In some embodiments, the social networking system 104 applies the first and second clustering algorithms to the sample of users identified as part of the act 328. By contrast, in some embodiments, the social networking system 104 applies the first and second clustering algorithms as part of identifying the sample of users. To illustrate this relationship between identifying a sample of users and applying the different clustering algorithms, FIG. 3B includes dotted arrows from the act 332 to the act 328 and from the act 332 to the act 328.

When applying the first and second clustering algorithms, the social networking system 104 applies different clustering algorithms. For example, the social networking system 104 optionally applies a clustering algorithm described in Leskovec and a clustering algorithm described in Mishra. Alternatively, the social networking system 104 optionally applies two different clustering algorithms described in Leskovec. As suggested above, the social networking system 104 may also apply any two different clustering algorithms suitable for a social network or social graph. Regardless of the clustering algorithm, in some embodiments, the social networking system 104 generates clusters by assigning each user a cluster identifier corresponding to the clusters generated by the first clustering algorithm and an alternative cluster identifier corresponding to the alternative cluster generated by the second clustering algorithm.

As the first and second clustering algorithms differ from one another, the first and second clustering algorithms presumably generate different clusters of algorithms. Accordingly, this disclosure describes the second clustering algorithm as generating alternative clusters of users—as in alternatives to the clusters of users generated by the first clustering algorithm. But in some cases, the first and second clustering algorithms may generate some clusters of users (or theoretically all clusters of users) that have the same constituent users. In other words, the first and second clustering algorithms may agree on the constituent users who are part of a cluster.

In many embodiments, however, some or all of the clusters of users generated by the first clustering algorithm differ from the alternative clusters of users. Despite those differences, the first clustering algorithm may generate one or more clusters of users comprising some users that overlap (or are also part of) an alternative cluster of users. In other words, the first and second clustering algorithms may generate overlapping clusters.

For example, the first clustering algorithm may generate the cluster 202h (shown in FIG. 2) comprising the users 204o, 204p, 204q, and 204r. But the second clustering algorithm may generate an alternative cluster that comprises the users 204i and 204j—and the user 204p. Accordingly, the cluster 202h and the alternative cluster would both include the user 204p, but otherwise include different users. As another example, the second clustering algorithm may generate an alternative cluster that comprises the users 204o, 204p, 204q, and 204r—and the user 204i. Accordingly, in this example, the alternative cluster would subsume the users within the cluster 202h and include an additional user, that is, the user 204i. FIGS. 5A and 5B below include additional examples of clusters and alternative clusters.

As further shown in FIG. 3B, after applying the first and second clustering algorithms, the social networking system 104 performs the act 336 of generating super clusters of users. As used in this disclosure, the term "super cluster" refers to a group of one or more clusters and one or more alternative clusters. Whereas the first clustering algorithm generates the one or more clusters, the second clustering algorithm generates the one or more alternative clusters. The social networking system 104 creates super clusters for later sorting clusters into trial groups without splitting a cluster and an alternative cluster that share an overlapping user. The super cluster helps ensure that a conversion action is attributed to a cluster effect based on either a cluster or an alternative cluster.

A super cluster may include, for example, both (a) the cluster 202h comprising the users 204o, 204p, 204q, and 204r and (b) an alternative cluster comprising the users 204i, 204j, and 204p. In this example, the social networking system 104 groups the cluster 202h and the alternative cluster into a super cluster because both clusters share an overlapping user, that is, the user 204p. A super cluster may also include multiple clusters and/or multiple alternative clusters. For example, a super cluster may include (a) the cluster 202h comprising the users 204o, 204p, 204q, and 204r; (b) an alternative cluster comprising the users 204i, 204j, and 204p; and (c) an additional alternative cluster comprising the users 204h and 204o. As above, the social networking system 104 groups the cluster 202h and the two alternative clusters into a super cluster to ensure that the sorting process does not split a cluster.

Depending on the number and position overlapping users, the social networking system 104 may include several other possible super clusters with multiple clusters from a first clustering algorithm and multiple alternative clusters from a second clustering algorithm. By contrast, in some instance, a super cluster may include a cluster and an alternative cluster that perfectly overlap, that is, a cluster and an alternative cluster that each comprise the same users. FIGS. 5A and 5B includes additional examples of super clusters.

When generating super clusters, in some embodiments, the social networking system 104 creates super clusters that clusters and alternative clusters that share one or more overlapping users are not separated. In some cases, the social networking system 104 generates super clusters by assigning a super-cluster identifier to each user within a sample of users. In other words, the social networking system 104 assigns a super-cluster identifier to each user representing the super cluster in which the social networking system 104 determines the user belongs. The term "super-cluster identifier" refers to a code, combination, number, or other identifier for a particular super cluster.

As further shown in FIG. 3B, after generating super clusters, the social networking system 104 performs the act 338 of assigning super clusters to a first group and the act 340 of assigning super clusters to a second group. For example, in some embodiments, the social networking system 104 randomly assigns super clusters to the first group and the second group. To make that random assignment, the social networking system 104 optionally uses super-cluster identifiers to randomly sort the super clusters of users into the first group or the second group. Accordingly, the social networking system 104 may randomly assign super clusters based on super-cluster identifiers.

Alternatively, in some embodiments, the social networking system 104 divides the super clusters into the first and the second groups. For example, the social networking system 104 may divide the super clusters such that a certain portion of the super clusters are in the first group and a certain portion of the super clusters are in the second group (e.g., evenly dividing the super clusters into the first and second groups).

After sorting the super clusters into the first and second groups, the social networking system 104 further sorts the super clusters from each of the first and second groups into test-and-control groups. As shown in FIG. 3B, for instance, the social networking system 104 performs the act 342 of assigning some super clusters to a first test group and the act 344 of assigning some super clusters to a first control group. For example, the social networking system 104 may randomly assign super clusters from the first group to the first test group or to the first control group according to super-cluster identifiers. In other words, the social networking system 104 randomly sorts the super-cluster identifiers assigned to each user having the same super-cluster identifier into either the first test group or the first control group. By sorting super clusters by super-cluster identifier, the social networking system 104 ensures that it does not split up into different groups clusters and alternative clusters that share overlapping users.

Alternatively, the social networking system 104 divides the super clusters from the first group into a certain portion of super clusters for the first test group and a certain portion of super clusters for the first control group. For example, the social networking system 104 may divide the super clusters from the first group evenly into the first test group and the first control group. Similarly, the social networking system 104 may divide the super clusters from the first group into some other predetermined portions (e.g., two thirds in the first test group and one third in the second test group).

As further shown in FIG. 3B, the social networking system 104 performs the act 346 of assigning some super clusters to a second test group and the act 348 of assigning some super clusters to a second control group. As suggested by their descriptions in the figures, the acts 346 and 348 in FIG. 3B are respectively similar to the acts 328 and 330 in FIG. 3B. Accordingly, the description and embodiments set forth above for the acts 328 and 330 respectively apply to the acts 346 and 348—except that the latter acts involve sorting super clusters from the second group into a second test group and a second control group.

After sorting super clusters into test-and-control groups, the social networking system 104 performs the act 350 of determining a first incremental lift and the act 352 of determining a second incremental lift. As suggested by their descriptions in the figures, the acts 350 and 352 in FIG. 3B are respectively similar to the acts 320 and 322 in FIG. 3A. Accordingly, the description and embodiments set forth above for the acts 320 and 322 respectively apply to the acts 350 and 352 with some exceptions. In contrast to the former acts, both the acts 350 and 352 involve determining that the latter acts involve sorting super clusters from the second group into a second test group and a second control group.

Additionally, both the first incremental lift and the second incremental lift shown in FIG. 3B reflect a cluster effect. Because both the first incremental lift and the second incremental lift capture incremental lift between test-and-control groups separated by super clusters, both the first incremental lift and the second incremental lift include incremental consumption or purchase potentially caused by a cluster effect. Accordingly, in contrast to the incremental lifts of FIG. 3A, the incremental lifts of FIG. 3B reflect incremental consumption or purchase accounted for by different clustering algorithms. In other words, the incremental lifts of FIG. 3B provide a direct cluster-to-cluster comparison.

The incremental lifts are specific to a clustering algorithm. In some embodiments, for example, the social networking system 104 determines a first incremental lift that reflects conversion actions attributable to the clusters generated by the first clustering algorithm. Similarly, the social networking system 104 optionally determines a second incremental lift that reflects conversion actions attributable to the alternative clusters generated by the first clustering algorithm.

The social networking system 104 also compares the effects of the different clustering algorithms. As shown in FIG. 3B, the social networking system 104 performs the act 354 of determining a cluster-effect differential. To determine a cluster-effect differential, in some embodiments, the social networking system 104 compares the one clustering algorithm's incremental lift to another clustering algorithm's incremental lift. In other words, the social networking system 104 compares (a) the first incremental lift that reflects conversion actions attributable to the clusters generated by the first clustering algorithm to (b) the second incremental lift that reflects conversion actions attributable to the alternative clusters generated by the second clustering algorithm.

In some such embodiments, the social networking system 104 determines a cluster-effect differential by determining a difference between the first and second incremental lifts. In certain cases, the social networking system 104 identifies the clustering algorithm that accounts for the higher incremental lift as the preferable clustering algorithm. This preference is based on the assumption that the clustering algorithm that better accounts for incremental lift—or that results in a larger cluster effect—more likely represents communication between users within a cluster.

Figure 4:
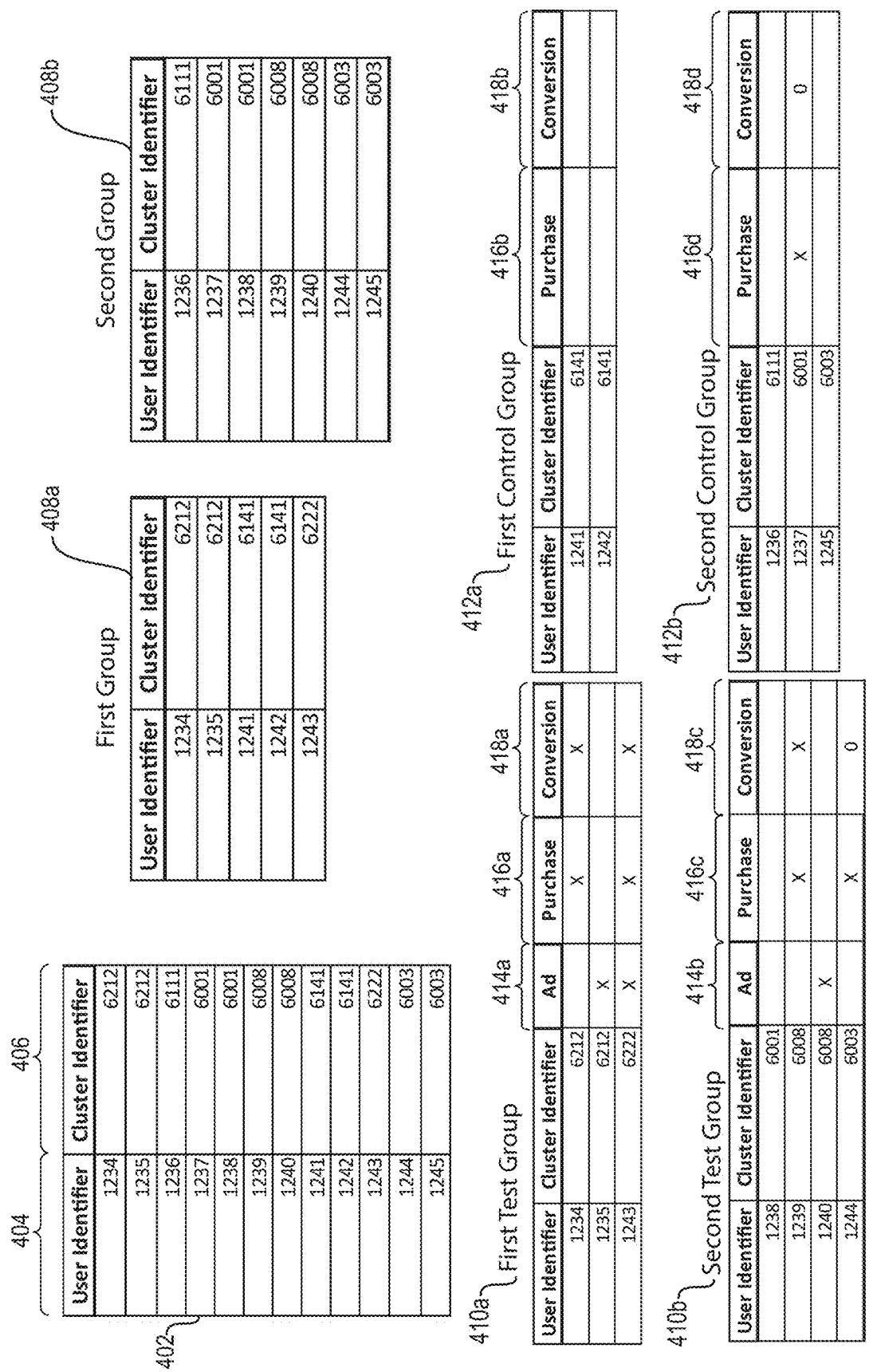

Turning now to FIG. 4, this figure illustrates a sample of users and trial groups in accordance with one or more embodiments of the acts described in FIG. 3A. As noted above, in some embodiments, the social networking system 104 identifies a sample of users and sorts those users into trial groups (e.g., by clusters or by users). FIG. 4 depicts a sample of users 402 and various trial groups that the social networking system 104 identifies and creates when performing some of the acts 302-326.

As shown in FIG. 4, the sample of users 402 includes a user identifier and a cluster identifier for each user within the sample. In this particular embodiment, the social networking system 104 applies a clustering algorithm as part of identifying the sample of users 402 and assigns cluster identifiers as part of generating the clusters of users. The user identifier for each user is shown in a user-identifier column 404. Similarly, the cluster identifier for each user is shown in a cluster-identifier column 406. For explanatory purposes, the sample of users 402 depicted in FIG. 4 includes user identifiers and cluster identifiers corresponding to twelve users. These twelve users are merely illustrative. In additional or alternative embodiments, the sample of users 402 are part of a larger sample.

As further shown in FIG. 4, the social networking system 104 separates the clusters of users from the sample of users 402 into a first group 408a and a second group 408b. Consistent with the disclosure above, the social networking system 104 randomly assigns the users into the first group 408a or the second group 408b according to cluster identifiers. In other words, the social networking system 104 sorts clusters of users by cluster identifier into either (but not both) the first group 408a or the second group 408b.

After separating the users from the sample of users 402 into the first group 408a or the second group 408b, the social networking system 104 separates clusters from the first group 408a into a first test group 410a and a first control group 412a. In particular, the social networking system 104 separates users based on cluster identifier to ensure that users having a same cluster identifier are assigned to either (but not both) the first test group 410a or the first control group 412a.

The social networking system 104 also separates users from the second group 408b into a second test group 410b and a second control group 412b. In particular, the social networking system 104 separates users based on user identifier. By separating the users according to user identifier—and not by cluster identifier—the social networking system 104 may split users who were part of a same cluster into different test or control groups. Specifically, social networking system 104 sorts the user corresponding to the user identifier 1244 and cluster identifier 6003 into the second test group 410b. But social networking system 104 sorts the user corresponding to the user identifier 1245 and cluster identifier 6003 into the second control group 412b. Both users share the cluster identifier 6003.

As further shown in FIG. 4, each of the test groups include a corresponding advertisement column, purchase column, and conversion column. Each of the control groups include a corresponding purchase column and conversion column. In particular, an advertisement column 414a, a purchase column 416a, and a conversion column 418a correspond to the first test group 410a; an advertisement column 414b, a purchase column 416c, and a conversion column 418c correspond to the second test group 410b; a purchase column 416b and a conversion column 418b correspond to the first control group 412a; and a purchase column 416d and a conversion column 418d correspond to the second control group 412b.

The advertisement columns 414a and 414b include marks indicating users to whom the social networking system 104 delivers a digital advertisement that features an item. As indicated by these marks in the advertisement columns 414a and 414b, the social networking system 104 delivers a digital advertisement to the users having user identifiers 1235 and 1240. Similarly, the purchase columns 416a, 416b, 416c, and 416d include marks indicating users who purchase the featured item. As indicated by the marks in the purchase columns 416a-416d, the users having user identifiers 1234, 1239, 1237, 1243, and 1244 purchased the featured item. Moreover, the conversion columns 418a, 418b, 418c, and 418d include marks indicating whether a purchase represents a conversion action. As indicated by the marks in the conversion columns 418a-418d, the purchases of the users having user identifiers 1234, 1239, and 1243 represent conversion actions, but the purchases of the users having user identifiers 1237 and 1244 do not represent conversion actions.

Consistent with the disclosure above, the social networking system 104 uses the data represented in FIG. 4 to determine a first incremental lift between the first test group 410a and the first control group 412a. Similarly, the social networking system 104 uses the data represented in FIG. 4 to determine a second incremental lift between the second test group 410b and the second control group 412b. Based on this data, the social networking system 104 determines a first incremental lift of two additional users who purchased the featured item—because two users purchased the featured item in the first test group 410a (as conversion actions) compared to zero users who purchased the featured item in the first control group 412a. Additionally, the social networking system 104 determines a second incremental lift of zero additional users who purchased the featured item—because one user purchased the featured item in the second test group 410b (as a conversion action) compared to one user who purchased the featured item in the second control group 412b.

In this particular embodiment, by comparing the first and second incremental lifts, the social networking system 104 determines the cluster effect as an expression of incremental consumption—that is, a cluster effect of two additional users who purchased the featured item. For explanatory purposes, FIG. 4 depicts incremental lifts and a cluster effect on a small scale. But as noted above, the social networking system 104 may use a larger sample of users and determine larger incremental lifts or cluster effects using different measurements.

Turning now to FIGS. 5A and 5B, this figure illustrates a sample of users and trial groups in accordance with one or more embodiments of the acts described in FIG. 3B. As noted above, in some embodiments, the social networking system 104 identifies a sample of users and sorts those users into trial groups by super cluster to compare different clustering algorithms and determine a cluster-effect differential. FIGS. 5A and 5B depict a sample of users 502 and various trial groups that the social networking system 104 identifies and creates when performing some of the acts 328-354. For explanatory purposes, the sample of users 502 depicted in FIG. 5A includes user identifiers and cluster identifiers corresponding to twenty-three users. These twenty-three users are merely illustrative. In additional or alternative embodiments, the sample of users 502 are part of a larger sample.

As shown in FIG. 5A, the sample of users 502 include a user identifier, a cluster identifier, and an alternative cluster identifier for each user within the sample. In this particular embodiment, the social networking system 104 applies a first clustering algorithm and a second clustering algorithm as part of identifying the sample of users 502. The social networking system 104 further assigns a cluster identifier corresponding to first clustering algorithm—and an alternative cluster identifier corresponding to the second clustering algorithm—as part of generating clusters of users and alternative clusters of users. A user-identifier column 504 includes the user identifier for each user. By contrast, a cluster-identifier column 506a includes the cluster identifier generated by the first clustering algorithm for each user. Similarly, an alternative-cluster-identifier column 506b includes the alternative cluster identifier generated by the second clustering algorithm for each user.

In addition to applying the first and second clustering algorithms to generate clusters of users and alternative clusters of users, the social networking system 104 generates super clusters. Consistent with the disclosure above, the social networking system 104 groups one or more clusters of users and one or more alternative clusters of users within each super cluster and assigns each user a super-cluster identifier. A super-cluster-identifier column 508 includes the super-cluster identifier for each user. As indicated by the super-cluster identifiers, some of the users within the sample of users 502 are part of (a) a cluster comprising one cluster of users, on the one hand, and (b) an alternative cluster comprising another cluster of users, on the other hand. Such super clusters contain so-called overlapping users, who include, but are not limited to, the users having the user identifiers 137, 139, 140, 146, 147, 148, 149, 156, and 157.

As further shown in FIG. 5A, the social networking system 104 separates the super clusters from the sample of users 502 into a first group 510a and a second group 510b. Consistent with the disclosure above, the social networking system 104 randomly assigns the users into either (but not both of) the first group 510a or the second group 510b according to super-cluster identifiers. In other words, the social networking system 104 sorts super clusters of users by super cluster identifier into the first group 510a or the second group 510b.

Turning now to FIG. 5B, after randomly separating the super clusters from the sample of users 402, the social networking system 104 separates super clusters from the first group 510a into a first test group 512a and a first control group 514a. In particular, the social networking system 104 separates users based on super cluster identifier to ensure that users having a same super cluster identifier are assigned to either (but not both) the first test group 512a or the first control group 514a.

Similarly, the social networking system 104 separates super clusters from the second group 510b into a second test group 512b and a second control group 514b. Here again, the social networking system 104 separates users based on super cluster identifier to ensure that users having a same super cluster identifier are assigned to either (but not both) the second test group 512b or the second control group 514b.

As further shown in FIG. 5B, each of the test groups include a corresponding advertisement column, purchase column, and conversion column. Each of the control groups include a corresponding purchase column and conversion column. In particular, an advertisement column 516a, a purchase column 518a, and a conversion column 520a correspond to the first test group 512a; an advertisement column 516b, a purchase column 518c, and a conversion column 520c correspond to the second test group 512b; a purchase column 518b and a conversion column 520b correspond to the first control group 514a; and a purchase column 518d and a conversion column 520d correspond to the second control group 514b.

The advertisement columns 516a and 516b include marks indicating users to whom the social networking system 104 delivers a digital advertisement that features an item. As indicated by the marks in the advertisement columns 516a and 516b, the social networking system 104 delivers a digital advertisement to the users having user identifiers 137, 144, 150, 151, and 158. Similarly, the purchase columns 518a, 518b, 518c, and 518d include marks indicating users who purchased the featured item. As indicated by the marks in the purchase columns 518a-518d, the users having user identifiers 136, 146, 149, 152, and 157 purchased the featured item.

By contrast, the conversion columns 520a, 520b, 520c, and 520d include marks indicating whether a purchase represents a conversion action. To facilitate comparing clustering algorithms, a purchase represents a conversion action in the first test group 512a only when (i) the social networking system 104 delivers a digital advertisement to a user within a cluster of users (which are designated by cluster identifiers) and (ii) a user in the same cluster of users purchases the featured item. To be clear, such a conversion action includes another user in the same cluster of users purchasing the featured item—even if the social networking system 104 did not deliver the digital advertisement to the purchasing user. If the social networking system 104 delivers a digital advertisement to a user within a cluster of users and a user within an alternative cluster of user purchases the featured item, the purchase does not represent a conversion action for purposes of comparison—even when the cluster of users and the alternative cluster of users include an overlapping user. As indicated by the marks in the conversion column 520a, the purchases of the users having user identifiers 152 and 157 represent conversion actions.

By contrast, a purchase represents a conversion action in the second test group 512b only when (i) the social networking system 104 delivers a digital advertisement to a user within an alternative cluster of users (which are designated by alternative cluster identifiers) and (ii) a user in the same alternative cluster of users purchases the featured item. Again, to be clear, such a conversion action includes another user in the same alternative cluster of users purchasing the featured item—even if the social networking system 104 did not deliver the digital advertisement to the purchasing user. If the social networking system 104 delivers a digital advertisement to a user within an alternative cluster of users and a user within a cluster of users purchases the featured item, the purchase does not represent a conversion action for purposes of comparison—even when the alternative cluster of users and the cluster of users include an overlapping user. As indicated by the marks in the conversion column 520c, the purchases of the users having user identifiers 136 and 149 do not represent conversion actions. The purchase of the user having user identifier 146 also does not represent a conversion action—because the social networking system 104 did not deliver an advertisement to the user or any other users within his or her alternative cluster of users.

Consistent with the disclosure above, the social networking system 104 uses the data represented in FIG. 5B to determine a first incremental lift between the first test group 512a and the first control group 514a. Similarly, the social networking system 104 uses the data represented in FIG. 5B to determine a second incremental lift between the second test group 512b and the second control group 514b. Based on this data, the social networking system 104 determines a first incremental lift of two additional users who purchased the featured item—because two users purchased the featured item in the first test group 512a (as conversion actions) compared to zero users who purchased the featured item in the first control group 514a. Additionally, the social networking system 104 determines a second incremental lift of zero additional users who purchased the featured item—because two users purchased the featured item in the second test group 512b compared to one user who purchased the featured item in the second control group 514b. The second incremental lift is zero because none of these latter purchases represent conversion actions.

By comparing the first and second incremental lifts, the social networking system 104 determines the cluster-effect differential as an expression of incremental consumption that is, a cluster-effect differential of two additional users who purchased the featured item in the clusters of users generated by the first clustering algorithm. Relatedly, the social networking system 104 also determines that the first clustering algorithm results in a cluster effect of two additional users who purchased the featured item and that the second clustering algorithm results in a cluster effect of zero additional users who purchased the featured item. In some embodiments, the social networking system 104 identifies the first clustering algorithm as the clustering algorithm generating clusters that more accurately reflect real-world clusters—when compared to the second clustering algorithm—because the first clustering algorithm produces a larger cluster effect.

For explanatory purposes, FIG. 5B depicts incremental lifts, cluster effects, and a cluster-effect differential on a small scale. As noted above, the social networking system 104 may use a larger sample of users and determine larger incremental lifts, cluster effects, or cluster-effect differentials using different measurements.

As noted above, in certain embodiments, the social networking system 104 generates a conversion report and target-cluster options as tools for applying a cluster effect. The social networking system 104 in turn provides the conversion report and target-cluster options to a client device for presentation within a graphical user interface. The conversion report provides an administrator with options to adjust distribution of digital content to users within target clusters based on a determined cluster effect.

As shown in FIG. 6, the social networking system 104 provides a conversion report 601 to an administrator client device 600. The administrator client device 600 in turn presents the conversion report 601 within a graphical user interface 602 of a screen 604. The conversion report 601 represents the results of an advertisement analysis using multiple test groups and control groups—with a first test group and a first control group sorted by cluster and a second test group and a second control group sorted by user. The social networking system 104 performs this advertisement analysis to determine a specific cluster effect—the impact that one or more household members' exposure to digital content has on conversion actions by other household members. The social networking system 104 performs the advertisement analysis by performing the acts depicted in FIG. 3A.

To represent the results of the advertisement analysis, the conversion report 601 includes various incremental lifts. These incremental lifts represent first incremental lifts between the first test group and the first control group, on the one hand, and second incremental lifts between the second test group and a second control group, on the other hand. Specifically, the conversion report 601 includes graphics representing a first incremental-sales lift 606a, a first total lift 608a, a first incremental-consumption lift 610a, a first conversion lift 612a, a first incremental-spend-amount lift 614a, and a first average-spend lift 616a. Similarly, the conversion report 601 includes graphics representing a second incremental-sales lift 606b, a second total lift 608b, a second incremental-consumption lift 610b, a second conversion lift 612b, a second incremental-spend-amount lift 614b, and a second average-spend lift 616b.

As further shown in FIG. 6, the conversion report 601 includes cluster effects 618a-618f. The social networking system 104 determines the cluster effects 618a-618f based on a comparison of corresponding first incremental lifts and second incremental lifts. As shown, the conversion report 601 includes graphics representing a first cluster effect 618a representing a divergence between the first incremental-sales lift 606a and the second incremental-sales lift 606b; a second cluster effect 618b representing a divergence between the first total lift 608a and the second total lift 608b; a third cluster effect 618c representing a divergence between the first incremental-consumption lift 610a and the second incremental-consumption lift 610b; a fourth cluster effect 618d representing a divergence between the first conversion lift 612a and the second conversion lift 612b; a fifth cluster effect 618e representing a divergence between the first incremental-spend-amount lift 614a and the second incremental-spend-amount lift 614b; and a sixth cluster effect 618f representing a divergence between the first average-spend lift 616a and the second average-spend lift 616b.

In addition to representations of incremental lifts and cluster effects, the conversion report 601 further includes target-cluster options. The target-cluster options correspond to clusters that the social networking system 104 determines as targets for increasing conversion actions—with increased or decreased distribution to users within the cluster. In other words, in some embodiments, the social networking system 104 suggests target clusters for increased or decreased digital-content distribution to users. The social networking system 104 identifies clusters comprising users to which increased digital-content distribution would increase conversion actions. In some such embodiments, the social networking system 104 identifies clusters with a highest relative cluster effect as target clusters.

As shown in FIG. 6, the social networking system 104 indicates target clusters within the target-cluster options 620a-620c. The first target-cluster option 620a indicates clusters comprising multiple users in general. The second target-cluster option 620b indicates clusters in a particular location. The third target-cluster option 620c indicates clusters in a particular economic class. While some of the target clusters in FIG. 6 represent a particular location or economic class, in additional or alternative embodiments, the social networking system 104 identifies target clusters representing different demographics, including, but not limited to, age, education level, ethnicity, political party, and religion.

When an administrator interactions with a target-cluster option (e.g., by click or touch gesture), the administrator client device 600 sends an indication of that interaction to the social networking system 104 to adjust distribution of digital content to users within the target cluster. For example, when the administrator client device 600 detects an interaction with the first target-cluster option 620a, the administrator client device 600 sends an indication to the social networking system 104 to adjust distribution of a digital advertisement. As shown in FIG. 6, the interaction indicates either increasing or decreasing distribution of the digital advertisement to users within clusters of users in general. The first target-cluster option 620a includes a radio button that (when adjusted) can increase or decrease a percentage of users within clusters to which the social networking system 104 distributes digital content. The second target-cluster option 620b and the third target-cluster option 620c function similarly to the first target-cluster option 620a and include radio buttons by which distribution may be increased or decreased.

Figure 7:
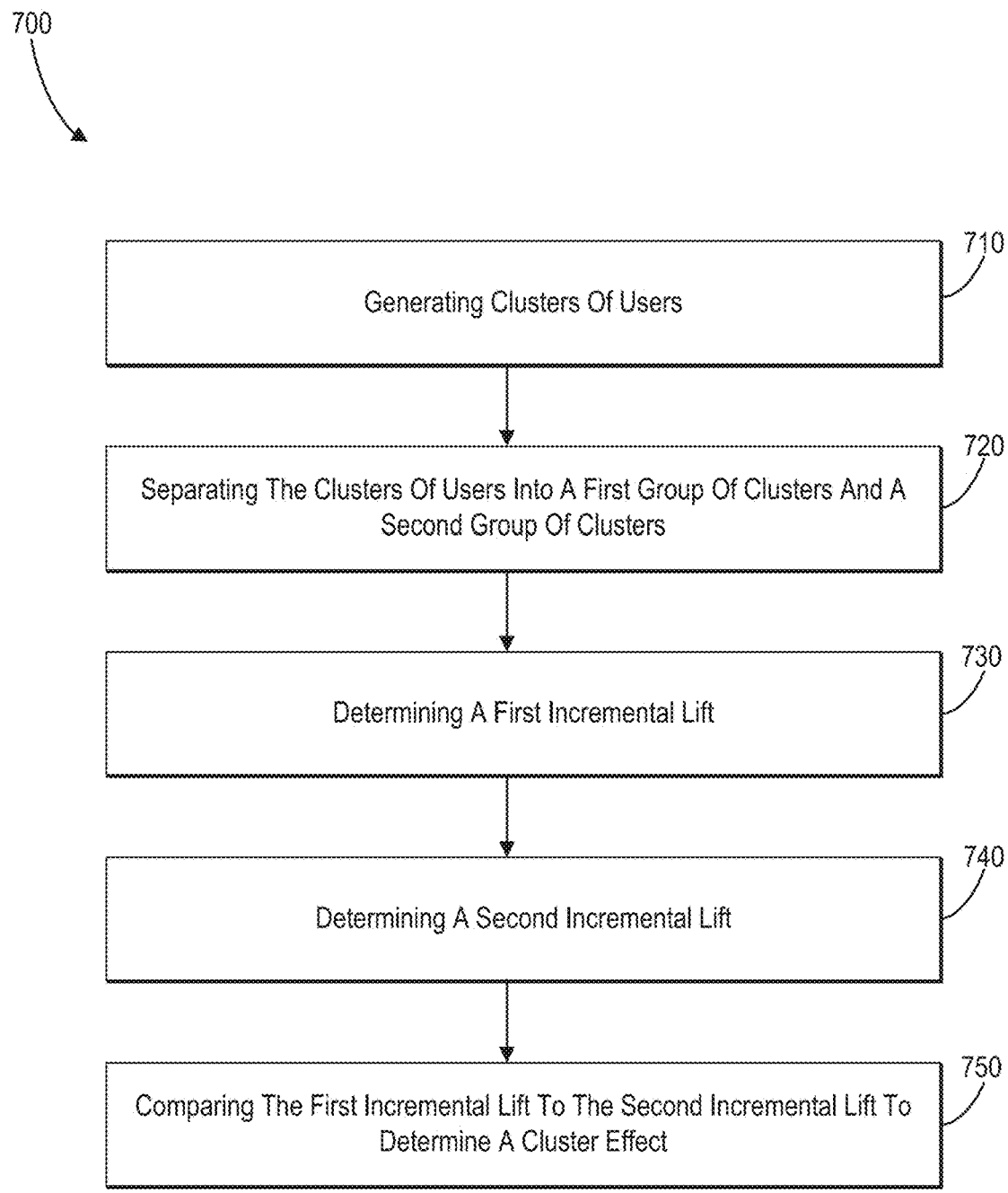
FIG. 7 illustrates a flowchart of a series of acts in a method of determining a cluster effect of users' exposure to digital content on other users' conversion actions in accordance with one or more embodiments.

Turning now to FIG. 7, this figure illustrates a flowchart of a series of acts 700 of determining a cluster effect of users' exposure to digital content on other users' conversion actions in accordance with one or more embodiments. While FIG. 7 illustrates acts according to one embodiment, alternative embodiments may omit, add to, reorder, and/or modify any of the acts shown in FIG. 7. The acts of FIG. 7 can be performed as part of a method. Alternatively, a non-transitory computer readable storage medium can comprise instructions that, when executed by one or more processors, cause a computing device to perform the acts depicted in FIG. 7. In still further embodiments, a system can perform the acts of FIG. 7.

As shown in FIG. 7, the acts 700 include an act 710 of generating clusters of users. In particular, in some embodiments, the act 710 includes generating clusters of users, each cluster having one or more users of a social networking system. Additionally, in certain embodiments, generating the clusters of users comprises generating the clusters of users based on one or more of an affinity coefficient, a designated relationship, a commonly used Internet Protocol ("IP") address, a common physical address, a common device identifier, tagged users within images, a common employer, and a common educational institution.

Moreover, in certain embodiments, generating the clusters of users comprises assigning user identifiers and cluster identifiers to the users of the social networking system. Similarly, in some embodiments, generating the clusters of users comprises applying a clustering algorithm to assign one or more users to a particular cluster of users based on attributes of the one or more users. In some cases, generating the clusters of users comprises applying a hash function to generate the clusters of users. Relatedly, in one or more embodiments, assigning the cluster identifiers to the users of the social networking system comprises applying a clustering algorithm to assign the cluster identifiers to the users of the social networking system.

In some cases, generating the clusters of users comprises generating a first cluster comprising a single user and a second cluster comprising multiple users having one or more common attributes. Similarly, in one or more embodiments, generating the clusters of users comprises generating the clusters of users, wherein each cluster is a cluster of one or more classmates, club members, coworkers, households, neighbors, organizational members, or social-network friends.

As further shown in FIG. 7, the acts 700 include an act 720 of separating the clusters of users into a first group of clusters and a second group of clusters. For example, in certain embodiments, separating the clusters of users into a first group of clusters and a second group of clusters comprises separating the clusters of users into the first group of clusters and the second group of clusters based on the cluster identifiers. Further, in some embodiments, separating the clusters of users into the first group of clusters and the second group of clusters based on the cluster identifiers comprises randomly assigning a particular cluster of users to the first group of clusters or the second group of clusters based on randomly associating a cluster identifier corresponding to the particular cluster of users with either the first group of clusters or the second group of clusters.

As further shown in FIG. 7, the acts 700 include an act 730 of determining a first incremental lift. In particular, in some embodiments, the act 730 includes determining a first incremental lift between a first test group and a first control group each comprising clusters of users from the first group of clusters. For example, in some embodiments, determining the first incremental lift between the first test group and the first control group comprises randomly assigning particular clusters of users from the first group of clusters to the first test group or the first control group based on cluster identifiers. Relatedly, in certain embodiments, determining the first incremental lift between the first test group and the first control group comprises delivering one or more instances of digital content to the first test group but not to the first control group.

As noted above, a first incremental lift can come in different measurements. For example, in some embodiments, determining the first incremental lift between the first test group and the first control group comprises determining a first average-spend lift, first conversion lift, first incremental-sales lift, first incremental-consumption lift, first incremental-spend-amount lift, or first total-sales lift.

As further shown in FIG. 7, the acts 700 include an act 740 of determining a second incremental lift. In particular, in some embodiments, the act 740 includes determining a second incremental lift between a second test group and a second control group each comprising individual users from the second group of clusters. For example, in some embodiments, determining the second incremental lift between the second test group and the second control group comprises randomly assigning users from the second group of clusters to the second test group or the second control group based on user identifiers. Relatedly, in certain embodiments, determining the second incremental lift between the second test group and the second control group comprises delivering the one or more instances of digital content to the second test group but not to the second control group.

As noted above, a second incremental lift can come in different measurements. For example, in some embodiments, determining the second incremental lift between the second test group and the second control group comprises determining a second average-spend lift, second conversion lift, second incremental-sales lift, second incremental-consumption lift, second incremental-spend-amount lift, or second total-sales lift.

As further shown in FIG. 7, the acts 700 include an act 750 of comparing the first incremental lift to the second incremental lift to determine a cluster effect. For example, in some embodiments, the act 750 includes determining a divergence between the first incremental lift and the second incremental lift.

In addition to the acts 710-750, in some embodiments, the acts 700 further include modifying distribution of digital content based on the cluster effect. Relatedly, in one or more embodiments, modifying the distribution of the digital content based on the cluster effect comprises increasing distribution of the digital content to users within clusters comprising multiple users having one or more common attributes.

Additionally, in certain embodiments, the acts 700 further include generating a conversion report comprising a representation of the cluster effect; and providing the conversion report to a client device. On a related note, in one or more embodiments, the conversion report comprises a selectable option to adjust distribution of digital content to users within clusters comprising multiple users having one or more common attributes. In some such embodiments, the conversion report comprises selectable options to adjust distribution of the digital content to users within clusters of a target demographic or target location.

Moreover, in some embodiments, the acts 700 further include applying an alternative clustering algorithm to generate alternative clusters of users, each alternative cluster having one or more users of the social networking system; separating the alternative clusters of users into an alternative first group of clusters and an alternative second group of clusters; determining an alternative first incremental lift between an alternative first test group and an alternative first control group each comprising alternative clusters of users from the alternative first group of clusters; determining an alternative second incremental lift between an alternative second test group and an alternative second control group each comprising individual users from the alternative second group of clusters; comparing the alternative first incremental lift to the alternative second incremental lift to determine an alternative cluster effect; and based on a comparison of the cluster effect and the alternative cluster effect, identifying either the clustering algorithm or the alternative clustering algorithm as generating clusters that capture a larger cluster effect.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system, including by one or more servers. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, virtual reality devices, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 8:
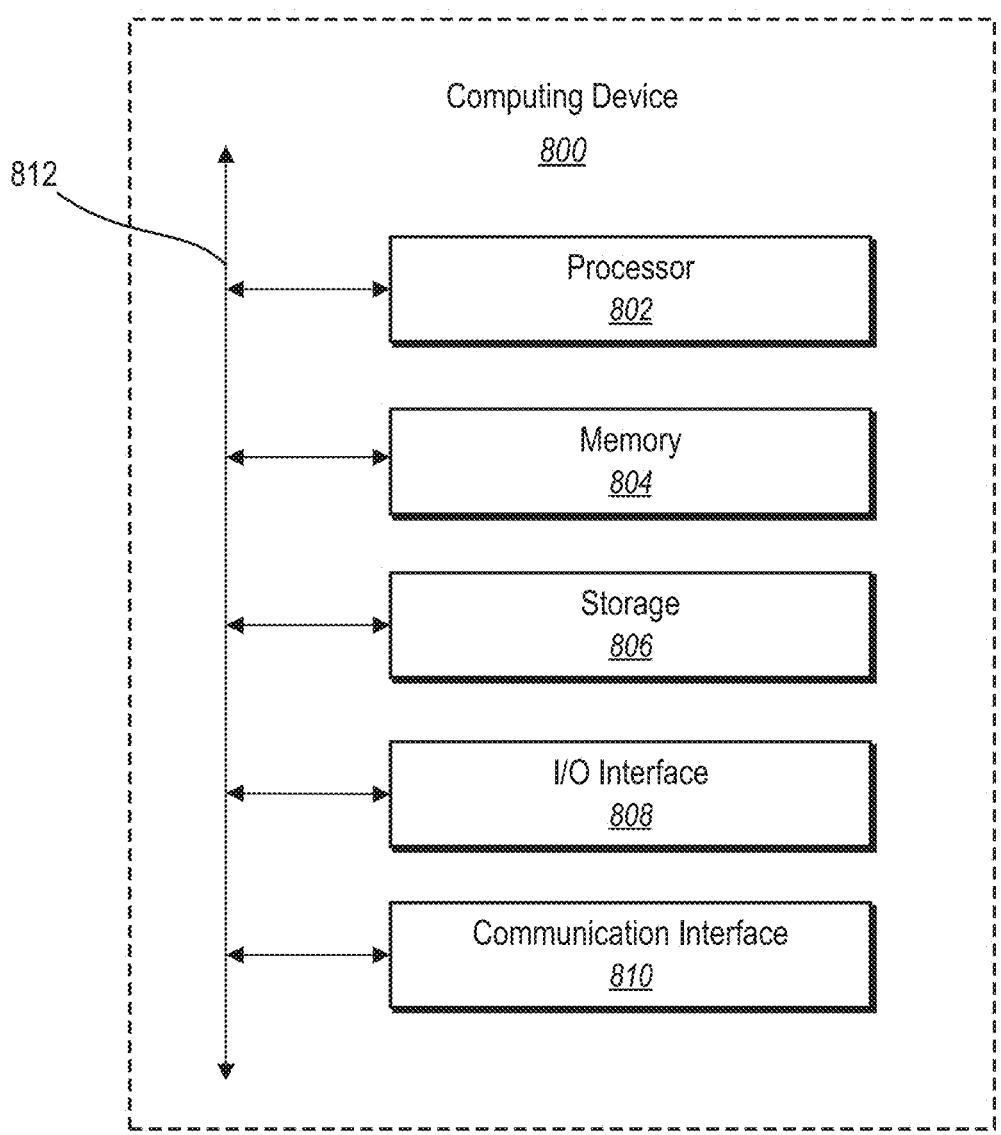
FIG. 8 illustrates a block diagram of an example computing device in accordance with one or more embodiments.

FIG. 8 illustrates a block diagram of exemplary computing device 800 that may be configured to perform one or more of the processes described above. One will appreciate that one or more computing devices such as the computing device 800 may implement the digital communications system described above. Furthermore, any of the server device(s) 102, client devices 108a-108n, and administrator client device 600 can be a computing device 800. As shown by FIG. 8, the computing device 800 can comprise a processor 802, a memory 804, a storage device 806, an I/O interface 808, and a communication interface 810, which may be communicatively coupled by way of a communication infrastructure 812. While an exemplary computing device 800 is shown in FIG. 8, the components illustrated in FIG. 8 are not intended to be limiting. Additional or alternative components may be used in other embodiments. Furthermore, in certain embodiments, the computing device 800 can include fewer components than those shown in FIG. 8. Components of the computing device 800 shown in FIG. 8 will now be described in additional detail.

In one or more embodiments, the processor 802 includes hardware for executing instructions, such as those making up a computer program. As an example and not by way of limitation, to execute instructions, the processor 802 may retrieve (or fetch) the instructions from an internal register, an internal cache, the memory 804, or the storage device 806 and decode and execute them. In one or more embodiments, the processor 802 may include one or more internal caches for data, instructions, or addresses. As an example and not by way of limitation, the processor 802 may include one or more instruction caches, one or more data caches, and one or more translation lookaside buffers ("TLBs"). Instructions in the instruction caches may be copies of instructions in the memory 804 or the storage device 806.

The memory 804 may be used for storing data, metadata, and programs for execution by the processor(s). The memory 804 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 804 may be internal or distributed memory.

The storage device 806 includes storage for storing data or instructions. As an example and not by way of limitation, storage device 806 can comprise a non-transitory storage medium described above. The storage device 806 may include a hard disk drive ("HDD"), flash memory, an optical disc, a magneto-optical disc, magnetic tape, or a Universal Serial Bus ("USB") drive or a combination of two or more of these. The storage device 806 may include removable or non-removable (or fixed) media, where appropriate. The storage device 806 may be internal or external to the computing device 800. In one or more embodiments, the storage device 806 is non-volatile, solid-state memory. In other embodiments, the storage device 806 includes read-only memory ("ROM"). Where appropriate, this ROM may be mask programmed ROM, programmable ROM ("PROM"), erasable PROM ("EPROM"), electrically erasable PROM ("EEPROM"), electrically alterable ROM ("EAROM"), or flash memory or a combination of two or more of these.

The I/O interface 808 allows a user to provide input to, receive output from, and otherwise transfer data to and receive data from computing device 800. The I/O interface 808 may include a mouse, a keypad or a keyboard, a touchscreen, a camera, an optical scanner, network interface, modem, other known I/O devices or a combination of such I/O interfaces. The I/O interface 808 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 808 is configured to provide graphical data to a display for presentation to a user. The graphical data may be representative of one or more graphical user interfaces and/or any other graphical content as may serve a particular implementation.

The communication interface 810 can include hardware, software, or both. In any event, the communication interface 810 can provide one or more interfaces for communication (such as, for example, packet-based communication) between the computing device 800 and one or more other computing devices or networks. As an example and not by way of limitation, the communication interface 810 may include a network interface controller ("NIC") or network adapter for communicating with an Ethernet or other wire-based network or a wireless NIC ("WNIC") or wireless adapter for communicating with a wireless network, such as a WI-FI.

Additionally, or alternatively, the communication interface 810 may facilitate communications with an ad hoc network, a personal area network ("PAN"), a local area network ("LAN"), a wide area network ("WAN"), a metropolitan area network ("MAN"), or one or more portions of the Internet or a combination of two or more of these. One or more portions of one or more of these networks may be wired or wireless. As an example, the communication interface 810 may facilitate communications with a wireless PAN ("WPAN") (such as, for example, a BLUETOOTH WPAN), a WI-FI network, a WI-MAX network, a cellular telephone network (such as, for example, a Global System for Mobile Communications ("GSM") network), or other suitable wireless network or a combination thereof.

Additionally, the communication interface 810 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication infrastructure 812 may include hardware, software, or both that couples components of the computing device 800 to each other. As an example and not by way of limitation, the communication infrastructure 812 may include an Accelerated Graphics Port ("AGP") or other graphics bus, an Enhanced Industry Standard Architecture ("EISA") bus, a front-side bus ("FSB"), a HYPERTRANSPORT ("HT") interconnect, an Industry Standard Architecture ("ISA") bus, an INFINIBAND interconnect, a low-pin-count ("LPC") bus, a memory bus, a Micro Channel Architecture ("MCA") bus, a Peripheral Component Interconnect ("PCI") bus, a PCI-Express ("PCIe") bus, a serial advanced technology attachment ("SATA") bus, a Video Electronics Standards Association local ("VLB") bus, or another suitable bus or a combination thereof.

As mentioned above, in one or more embodiments, the digital communications system comprises a social-networking system. A social-networking system may enable its users (such as persons or organizations) to interact with the system and with each other. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, on-line calendars and event organization, messaging, games, or advertisements) to facilitate social interaction between or among users. Also, the social-networking system may allow users to post photographs and other visual media items to a user's profile page (typically known as "wall posts" or "timeline posts") or in a photo album, both of which may be accessible to other users of the social-networking system depending upon the user's configured privacy settings.

Figure 9:
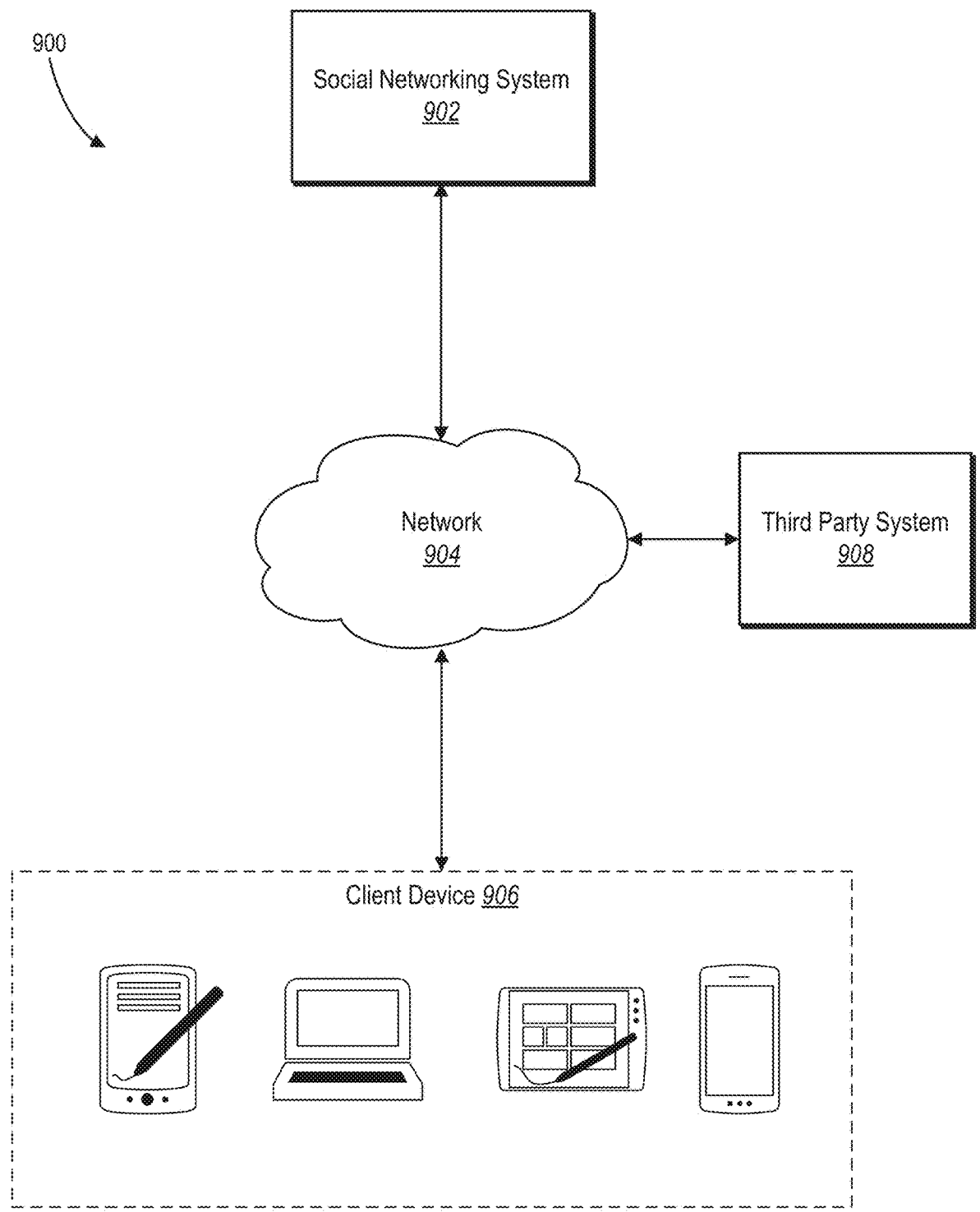
FIG. 9 illustrates a network environment of a networking system according to one or more embodiments.

FIG. 9 illustrates an example network environment 900 of a social-networking system. Network environment 900 includes a client device 906, a social networking system 902, and a third-party system 908 connected to each other by a network 904. Although FIG. 9 illustrates a particular arrangement of client device 906, social networking system 902, third-party system 908, and network 904, this disclosure contemplates any suitable arrangement of client device 906, social networking system 902, third-party system 908, and network 904. As an example and not by way of limitation, two or more of client device 906, social networking system 902, and third-party system 908 may be connected to each other directly, bypassing network 904. As another example, two or more of client device 906, social networking system 902, and third-party system 908 may be physically or logically co-located with each other in whole or in part. Moreover, although FIG. 9 illustrates a particular number of client devices 906, social networking systems 902, third-party systems 908, and networks 904, this disclosure contemplates any suitable number of client devices 906, social networking systems 902, third-party systems 908, and networks 904. As an example and not by way of limitation, network environment 900 may include multiple client devices 906, social networking systems 902, third-party systems 908, and networks 904.

This disclosure contemplates any suitable network 904. As an example and not by way of limitation, one or more portions of network 904 may include an ad hoc network, an intranet, an extranet, a virtual private network ("VPN"), a local area network ("LAN"), a wireless LAN ("WLAN"), a wide area network ("WAN"), a wireless WAN ("WWAN"), a metropolitan area network ("MAN"), a portion of the Internet, a portion of the Public Switched Telephone Network ("PSTN"), a cellular telephone network, or a combination of two or more of these. Network 904 may include one or more networks 904.

Links may connect client device 906, social networking system 902, and third-party system 908 to communication network 904 or to each other. This disclosure contemplates any suitable links. In particular embodiments, one or more links include one or more wireline (such as for example Digital Subscriber Line ("DSL") or Data Over Cable Service Interface Specification ("DOCSIS")), wireless (such as for example Wi-Fi or Worldwide Interoperability for Microwave Access ("WiMAX")), or optical (such as for example Synchronous Optical Network ("SONET") or Synchronous Digital Hierarchy ("SDH")) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 900. One or more first links may differ in one or more respects from one or more second links.

In particular embodiments, client device 906 may be an electronic device including hardware, software, or embedded logic components or a combination of two or more such components and capable of carrying out the appropriate functionalities implemented or supported by client device 906. As an example and not by way of limitation, a client device 906 may include any of the computing devices discussed above in relation to FIG. 9. A client device 906 may enable a network user at client device 906 to access network 904. A client device 906 may enable its user to communicate with other users at other client devices 906.

In particular embodiments, client device 906 may include a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client device 906 may enter a Uniform Resource Locator ("URL") or other address directing the web browser to a particular server (such as server, or a server associated with a third-party system 908), and the web browser may generate a Hyper Text Transfer Protocol ("HTTP") request and communicate the HTTP request to server. The server may accept the HTTP request and communicate to client device 906 one or more Hyper Text Markup Language ("HTML") files responsive to the HTTP request. Client device 906 may render a webpage based on the HTML files from the server for presentation to the user. This disclosure contemplates any suitable webpage files. As an example and not by way of limitation, webpages may render from HTML files, Extensible Hyper Text Markup Language ("XHTML") files, or Extensible Markup Language ("XML") files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social networking system 902 may be a network-addressable computing system that can host an online social network. Social networking system 902 may generate, store, receive, and send social-networking data, such as, for example, user-profile data, concept-profile data, social-graph information, or other suitable data related to the online social network. Social networking system 902 may be accessed by the other components of network environment 900 either directly or via network 904. In particular embodiments, social networking system 902 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by server. In particular embodiments, social networking system 902 may include one or more data stores. Data stores may be used to store various types of information. In particular embodiments, the information stored in data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable a client device 906, a social networking system 902, or a third-party system 908 to manage, retrieve, modify, add, or delete, the information stored in data store.

In particular embodiments, social networking system 902 may store one or more social graphs in one or more data stores. In particular embodiments, a social graph may include multiple nodes—which may include multiple user nodes (each corresponding to a particular user) or multiple concept nodes (each corresponding to a particular concept)—and multiple edges connecting the nodes. Social networking system 902 may provide users of the online social network the ability to communicate and interact with other users. In particular embodiments, users may join the online social network via social networking system 902 and then add connections (e.g., relationships) to a number of other users of social networking system 902 whom they want to be connected to. Herein, the term "friend" may refer to any other user of social networking system 902 with whom a user has formed a connection, association, or relationship via social networking system 902.

In particular embodiments, social networking system 902 may provide users with the ability to take actions on various types of items or objects, supported by social networking system 902. As an example and not by way of limitation, the items and objects may include groups or social networks to which users of social networking system 902 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social networking system 902 or by an external system of third-party system 908, which is separate from social networking system 902 and coupled to social networking system 902 via a network 904.

In particular embodiments, social networking system 902 may be capable of linking a variety of entities. As an example and not by way of limitation, social networking system 902 may enable users to interact with each other as well as receive content from third-party systems 908 or other entities, or to allow users to interact with these entities through an application programming interfaces ("API") or other communication channels.

In particular embodiments, a third-party system 908 may include one or more types of servers, one or more data stores, one or more interfaces, including but not limited to APIs, one or more web services, one or more content sources, one or more networks, or any other suitable components, e.g., that servers may communicate with. A third-party system 908 may be operated by a different entity from an entity operating social networking system 902. In particular embodiments, however, social networking system 902 and third-party systems 908 may operate in conjunction with each other to provide social-networking services to users of social networking system 902 or third-party systems 908. In this sense, social networking system 902 may provide a platform, or backbone, which other systems, such as third-party systems 908, may use to provide social-networking services and functionality to users across the Internet.

In particular embodiments, a third-party system 908 may include a third-party content object provider. A third-party content object provider may include one or more sources of content objects, which may be communicated to a client device 906. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social networking system 902 also includes user-generated content objects, which may enhance a user's interactions with social networking system 902. User-generated content may include anything a user can add, upload, send, or "post" to social networking system 902. As an example and not by way of limitation, a user communicates posts to social networking system 902 from a client device 906. Posts may include data such as status updates or other textual data, location information, photos, videos, links, music or other similar data or media. Content may also be added to social networking system 902 by a third-party through a "communication channel," such as a newsfeed or stream.

In particular embodiments, social networking system 902 may include a variety of servers, sub-systems, programs, modules, logs, and data stores. In particular embodiments, social networking system 902 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social networking system 902 may also include suitable components such as network interfaces, security mechanisms, load balancers, failover servers, management-and-network-operations consoles, other suitable components, or any suitable combination thereof. In particular embodiments, social networking system 902 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social networking system 902 to one or more client devices 906 or one or more third-party system 908 via network 904. The web server may include a mail server or other messaging functionality for receiving and routing messages between social networking system 902 and one or more client devices 906. An API-request server may allow a third-party system 908 to access information from social networking system 902 by calling one or more APIs. An action logger may be used to receive communications from a web server about a user's actions on or off social networking system 902. In conjunction with the action log, a third-party-content-object log may be maintained of user exposures to third-party-content objects. A notification controller may provide information regarding content objects to a client device 906. Information may be pushed to a client device 906 as notifications, or information may be pulled from client device 906 responsive to a request received from client device 906. Authorization servers may be used to enforce one or more privacy settings of the users of social networking system 902. A privacy setting of a user determines how particular information associated with a user can be shared. The authorization server may allow users to opt in to or opt out of having their actions logged by social networking system 902 or shared with other systems (e.g., third-party system 908), such as, for example, by setting appropriate privacy settings. Third-party-content-object stores may be used to store content objects received from third parties, such as a third-party system 908. Location stores may be used for storing location information received from client devices 906 associated with users. Advertisement-pricing modules may combine social information, the current time, location information, or other suitable information to provide relevant advertisements, in the form of notifications, to a user.

Figure 10:
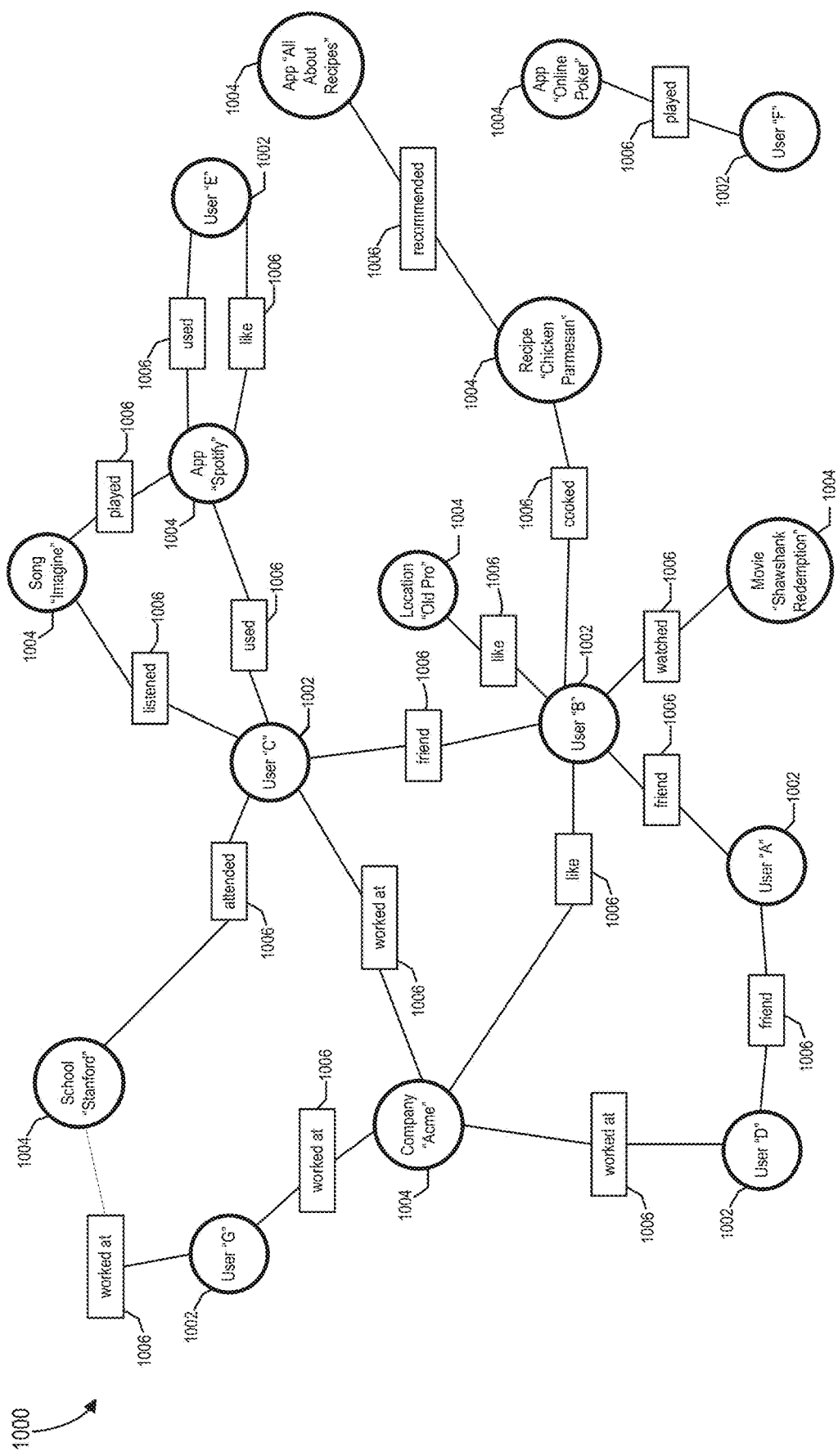
FIG. 10 illustrates an example social graph for a networking system in accordance with one or more embodiments.

FIG. 10 illustrates example social graph 1000. In particular embodiments, social networking system 902 may store one or more social graphs 1000 in one or more data stores. In particular embodiments, social graph 1000 may include multiple nodes—which may include multiple user nodes 1002 or multiple concept nodes 1004—and multiple edges 1006 connecting the nodes. Example social graph 1000 illustrated in FIG. 10 is shown, for didactic purposes, in a two-dimensional visual map representation. In particular embodiments, a social networking system 902, client device 906, or third-party system 908 may access social graph 1000 and related social-graph information for suitable applications. The nodes and edges of social graph 1000 may be stored as data objects, for example, in a data store (such as a social-graph database). Such a data store may include one or more searchable or query able indexes of nodes or edges of social graph 1000.

In particular embodiments, a user node 1002 may correspond to a user of social networking system 902. As an example and not by way of limitation, a user may be an individual (human user), an entity (e.g., an enterprise, business, or third-party application), or a group (e.g., of individuals or entities) that interacts or communicates with or over social networking system 902. In particular embodiments, when a user registers for an account with social networking system 902, social networking system 902 may create a user node 1002 corresponding to the user, and store the user node 1002 in one or more data stores. Users and user nodes 1002 described herein may, where appropriate, refer to registered users and user nodes 1002 associated with registered users. In addition, or as an alternative, users and user nodes 1002 described herein may, where appropriate, refer to users that have not registered with social networking system 902. In particular embodiments, a user node 1002 may be associated with information provided by a user or information gathered by various systems, including social networking system 902. As an example and not by way of limitation, a user may provide his or her name, profile picture, contact information, birth date, sex, marital status, family status, employment, education background, preferences, interests, or other demographic information. Each user node of the social graph may have a corresponding web page (typically known as a profile page). In response to a request including a user name, the social-networking system can access a user node corresponding to the user name, and construct a profile page including the name, a profile picture, and other information associated with the user. A profile page of a first user may display to a second user all or a portion of the first user's information based on one or more privacy settings by the first user and the relationship between the first user and the second user.

In particular embodiments, a concept node 1004 may correspond to a concept. As an example and not by way of limitation, a concept may correspond to a place (such as, for example, a movie theater, restaurant, landmark, or city); a website (such as, for example, a website associated with social networking system 902 or a third-party website associated with a web-application server); an entity (such as, for example, a person, business, group, sports team, or celebrity); a resource (such as, for example, an audio file, video file, digital photo, text file, structured document, or application) which may be located within social networking system 902 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 1004 may be associated with information of a concept provided by a user or information gathered by various systems, including social networking system 902. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address);

other suitable concept information; or any suitable combination of such information. In particular embodiments, a concept node 1004 may be associated with one or more data objects corresponding to information associated with concept nodes 1004. In particular embodiments, a concept node 1004 may correspond to one or more webpages.

In particular embodiments, a node in social graph 1000 may represent or be represented by a webpage (which may be referred to as a "profile page"). Profile pages may be hosted by or accessible to social networking system 902. Profile pages may also be hosted on third-party websites associated with a third-party system 908. As an example and not by way of limitation, a profile page corresponding to a particular external webpage may be the particular external webpage and the profile page may correspond to a particular concept node 1004. Profile pages may be viewable by all or a selected subset of other users. As an example and not by way of limitation, a user node 1002 may have a corresponding user-profile page in which the corresponding user may add content, make declarations, or otherwise express himself or herself. As another example and not by way of limitation, a concept node 1004 may have a corresponding concept-profile page in which one or more users may add content, make declarations, or express themselves, particularly in relation to the concept corresponding to concept nodes 1004.

In particular embodiments, a concept node 1004 may represent a third-party webpage or resource hosted by a third-party system 908. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client device 906 to send to social networking system 902 a message indicating the user's action. In response to the message, social networking system 902 may create an edge (e.g., an "eat" edge) between a user node 1002 corresponding to the user and a concept node 1004 corresponding to the third-party webpage or resource and store edge 1006 in one or more data stores.

In particular embodiments, a pair of nodes in social graph 1000 may be connected to each other by one or more edges 1006. An edge 1006 connecting a pair of nodes may represent a relationship between the pair of nodes. In particular embodiments, an edge 1006 may include or represent one or more data objects or attributes corresponding to the relationship between a pair of nodes. As an example and not by way of limitation, a first user may indicate that a second user is a "friend" of the first user. In response to this indication, social networking system 902 may send a "friend request" to the second user. If the second user confirms the "friend request," social networking system 902 may create an edge 1006 connecting the first user's user node 1002 to the second user's user node 1002 in social graph 1000 and store edge 1006 as social-graph information in one or more of data stores. In the example of FIG. 10, social graph 1000 includes an edge 1006 indicating a friend relation between user nodes 1002 of user "A" and user "B" and an edge indicating a friend relation between user nodes 1002 of user "C" and user "B." Although this disclosure describes or illustrates particular edges 1006 with particular attributes connecting particular user nodes 1002, this disclosure contemplates any suitable edges 1006 with any suitable attributes connecting user nodes 1002. As an example and not by way of limitation, an edge 1006 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 1000 by one or more edges 1006.

In particular embodiments, an edge 1006 between a user node 1002 and a concept node 1004 may represent a particular action or activity performed by a user associated with user node 1002 toward a concept associated with a concept node 1004. As an example and not by way of limitation, as illustrated in FIG. 10, a user may "like," "attended," "played," "listened," "cooked," "worked at," or "watched" a concept, each of which may correspond to an edge type or subtype. A concept-profile page corresponding to a concept node 1004 may include, for example, a selectable "check in" icon (such as, for example, a clickable "check in" icon) or a selectable "add to favorites" icon. Similarly, after a user clicks these icons, social networking system 902 may create a "favorite" edge or a "check in" edge in response to a user's action corresponding to a respective action. As another example and not by way of limitation, a user (user "C") may listen to a particular song ("Ramble On") using a particular application (SPOTIFY, which is an online music application). In this case, social networking system 902 may create a "listened" edge 1006 and a "used" edge (as illustrated in FIG. 10) between user nodes 1002 corresponding to the user and concept nodes 1004 corresponding to the song and application to indicate that the user listened to the song and used the application. Moreover, social networking system 902 may create a "played" edge 1006 (as illustrated in FIG. 10) between concept nodes 1004 corresponding to the song and the application to indicate that the particular song was played by the particular application. In this case, "played" edge 1006 corresponds to an action performed by an external application (SPOTIFY) on an external audio file (the song "Imagine"). Although this disclosure describes particular edges 1006 with particular attributes connecting user nodes 1002 and concept nodes 1004, this disclosure contemplates any suitable edges 1006 with any suitable attributes connecting user nodes 1002 and concept nodes 1004. Moreover, although this disclosure describes edges between a user node 1002 and a concept node 1004 representing a single relationship, this disclosure contemplates edges between a user node 1002 and a concept node 1004 representing one or more relationships. As an example and not by way of limitation, an edge 1006 may represent both that a user likes and has used at a particular concept. Alternatively, another edge 1006 may represent each type of relationship (or multiples of a single relationship) between a user node 1002 and a concept node 1004 (as illustrated in FIG. 10 between user node 1002 for user "E" and concept nodes 1004 for "SPOTIFY").

In particular embodiments, social networking system 902 may create an edge 1006 between a user node 1002 and a concept node 1004 in social graph 1000. As an example and not by way of limitation, a user viewing a concept-profile page (such as, for example, by using a web browser or a special-purpose application hosted by the user's client device 906) may indicate that he or she likes the concept represented by the concept nodes 1004 by clicking or selecting a "Like" icon, which may cause the user's client device 906 to send to social networking system 902 a message indicating the user's liking of the concept associated with the concept-profile page. In response to the message, social networking system 902 may create an edge 1006 between user node 1002 associated with the user and concept nodes 1004, as illustrated by "like" edge 1006 between the user and concept nodes 1004. In particular embodiments, social networking system 902 may store an edge 1006 in one or more data stores. In particular embodiments, an edge 1006 may be automatically formed by social networking system 902 in response to a particular user action. As an example and not by way of limitation, if a first user uploads a picture, watches a movie, or listens to a song, an edge 1006 may be formed between user node 1002 corresponding to the first user and concept nodes 1004 corresponding to those concepts. Although this disclosure describes forming particular edges 1006 in particular manners, this disclosure contemplates forming any suitable edges 1006 in any suitable manner. In one or more embodiments, the social networking system 902 includes a node for each digital graphic and associated animation(s).

In particular embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more webpages, in one or more e-mails, or in connection with search results requested by a user. In addition, or as an alternative, an advertisement may be one or more sponsored stories (e.g., a news-feed or ticker item on social networking system 902). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. As an example and not by way of limitation, advertisements may be included among the search results of a search-results page, where sponsored content is promoted over non-sponsored content.

In particular embodiments, an advertisement may be requested for display within social-networking-system webpages, third-party webpages, or other pages. An advertisement may be displayed in a dedicated portion of a page, such as in a banner area at the top of the page, in a column at the side of the page, in a GUI of the page, in a pop-up window, in a drop-down menu, in an input field of the page, over the top of content of the page, or elsewhere with respect to the page. In addition or as an alternative, an advertisement may be displayed within an application. An advertisement may be displayed within dedicated pages, requiring the user to interact with or watch the advertisement before the user may access a page or utilize an application. The user may, for example view the advertisement through a web browser.

A user may interact with an advertisement in any suitable manner. The user may click or otherwise select the advertisement. By selecting the advertisement, the user may be directed to (or a browser or other application being used by the user) a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, social networking system 902 may execute or modify a particular action of the user.

An advertisement may also include social-networking-system functionality that a user may interact with. As an example and not by way of limitation, an advertisement may enable a user to "like" or otherwise endorse the advertisement by selecting an icon or link associated with endorsement. As another example and not by way of limitation, an advertisement may enable a user to search (e.g., by executing a query) for content related to the advertiser. Similarly, a user may share the advertisement with another user (e.g., through social networking system 902) or RSVP (e.g., through social networking system 902) to an event associated with the advertisement. In addition or as an alternative, an advertisement may include social-networking-system context directed to the user. As an example and not by way of limitation, an advertisement may display information about a friend of the user within social networking system 902 who has taken an action associated with the subject matter of the advertisement.

In particular embodiments, social networking system 902 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 908 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social networking system 902 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part based on the history of the user's actions. Coefficients may be used to predict any number of actions, which may be within or outside of the online social network. As an example and not by way of limitation, these actions may include various types of communications, such as sending messages, posting content, or commenting on content; various types of an observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social networking system 902 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social networking system 902 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social networking system 902 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social networking system 902 may calculate a coefficient based on a user's actions. Social networking system 902 may monitor such actions on the online social network, on a third-party system 908, on other suitable systems, or any combination thereof. Any suitable type of user actions may be tracked or monitored. Typical user actions include viewing profile pages, creating or posting content, interacting with content, joining groups, listing and confirming attendance at events, checking-in at locations, liking particular pages, creating pages, and performing other tasks that facilitate social action. In particular embodiments, social networking system 902 may calculate a coefficient based on the user's actions with particular types of content. The content may be associated with the online social network, a third-party system 908, or another suitable system. The content may include users, profile pages, posts, news stories, headlines, instant messages, chat room conversations, emails, advertisements, pictures, video, music, other suitable objects, or any combination thereof. Social networking system 902 may analyze a user's actions to determine whether one or more of the actions indicate an affinity for subject matter, content, other users, and so forth. As an example and not by way of limitation, if a user may make frequently posts content related to "coffee" or variants thereof, social networking system 902 may determine the user has a high coefficient with respect to the concept "coffee." Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social networking system 902 may calculate a coefficient based on the type of relationship between particular objects. Referencing the social graph 1000, social networking system 902 may analyze the number and/or type of edges 1006 connecting particular user nodes 1002 and concept nodes 1004 when calculating a coefficient. As an example and not by way of limitation, user nodes 1002 that are connected by a spouse-type edge (representing that the two users are married) may be assigned a higher coefficient than user nodes 1002 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, social networking system 902 may determine that the user has a higher coefficient with respect to the first photo than the second photo because having a tagged-in-type relationship with content may be assigned a higher weight and/or rating than having a like-type relationship with content. In particular embodiments, social networking system 902 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social networking system 902 may determine that the first user should also have a relatively high coefficient for the particular object. In particular embodiments, the coefficient may be based on the degree of separation between particular objects. Degree of separation between any two nodes is defined as the minimum number of hops required to traverse the social graph from one node to the other. A degree of separation between two nodes can be considered a measure of relatedness between the users or the concepts represented by the two nodes in the social graph. For example, two users having user nodes that are directly connected by an edge (i.e., are first-degree nodes) may be described as "connected users" or "friends." Similarly, two users having user nodes that are connected only through another user node (i.e., are second-degree nodes) may be described as "friends of friends." The lower coefficient may represent the decreasing likelihood that the first user will share an interest in content objects of the user that is indirectly connected to the first user in the social graph 1000. As an example and not by way of limitation, social-graph entities that are closer in the social graph 1000 (i.e., fewer degrees of separation) may have a higher coefficient than entities that are further apart in the social graph 1000.

In particular embodiments, social networking system 902 may calculate a coefficient based on location information. Objects that are geographically closer to each other may be considered to be more related, or of more interest, to each other than more distant objects. In particular embodiments, the coefficient of a user towards a particular object may be based on the proximity of the object's location to a current location associated with the user (or the location of a client device 906 of the user). A first user may be more interested in other users or concepts that are closer to the first user. As an example and not by way of limitation, if a user is one mile from an airport and two miles from a gas station, social networking system 902 may determine that the user has a higher coefficient for the airport than the gas station based on the proximity of the airport to the user.

In particular embodiments, social networking system 902 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social networking system 902 may provide information that is relevant to user's interests and current circumstances, increasing the likelihood that they will find such information of interest. In particular embodiments, social networking system 902 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social networking system 902 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social networking system 902 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 908 (e.g., via an API or other communication channel), or from another suitable system. In response to the request, social networking system 902 may calculate the coefficient (or access the coefficient information if it has previously been calculated and stored). In particular embodiments, social networking system 902 may measure an affinity with respect to a particular process. Different processes (both internal and external to the online social network) may request a coefficient for a particular object or set of objects. Social networking system 902 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or acts disclosed in U.S. patent application Ser. No. 11/503,093, filed 11 Aug. 2006, U.S. patent application Ser. No. 12/978,027, filed 22 Dec. 2010, U.S. patent application Ser. No. 12/978,265, filed 23 Dec. 2010, and U.S. patent application Ser. No. 13/642,869, filed 1 Oct. 2012, each of which is incorporated by reference.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 1004 corresponding to a particular photo may have a privacy setting specifying that the photo may only be accessed by users tagged in the photo and their friends. In particular embodiments, privacy settings may allow users to opt in or opt out of having their actions logged by social networking system 902 or shared with other systems (e.g., third-party system 908). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 908, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers may be authorization/privacy servers for enforcing privacy settings. In response to a request from a user (or other entity) for a particular object stored in a data store, social networking system 902 may send a request to the data store for the object. The request may identify the user associated with the request and may only be sent to the user (or a client device 906 of the user) if the authorization server determines that the user is authorized to access the object based on the privacy settings associated with the object. If the requesting user is not authorized to access the object, the authorization server may prevent the requested object from being retrieved from the data store, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

The foregoing specification is described with reference to specific exemplary embodiments thereof. Various embodiments and aspects of the disclosure are described with reference to details discussed herein, and the accompanying drawings illustrate the various embodiments. The description above and drawings are illustrative and are not to be construed as limiting. Numerous specific details are described to provide a thorough understanding of various embodiments.

The additional or alternative embodiments may be embodied in other specific forms without departing from its spirit or essential characteristics. The described embodiments are to be considered in all respects only as illustrative and not restrictive. The scope of the present disclosure is, therefore, indicated by the appended claims rather than by the foregoing description. All changes that come within the meaning and range of equivalency of the claims are to be embraced within their scope.

We claim:

1. A method comprising:
    generating clusters of users, each cluster having one or more users of a social networking system;
    separating the clusters of users into a first group of clusters and a second group of clusters;
    assigning particular clusters of users from the first group of clusters to a first test group and a first control group;
    determining a first incremental lift between the first test group and the first control group from the first group of clusters;
    assigning individual users from the second group of clusters to a second test group and a second control group;
    determining a second incremental lift between the second test group and the second control group from the second group of clusters; and
    comparing the first incremental lift to the second incremental lift to determine a cluster effect.

2. The method of claim 1, wherein generating the clusters of users comprises generating the clusters of users based on one or more of an affinity coefficient, a designated relationship, a commonly used Internet Protocol ("IP") address, a common physical address, a common device identifier, tagged users within images, a common employer, or a common educational institution.

3. The method of claim 1, further comprising modifying distribution of digital content based on the cluster effect.

4. The method of claim 3, wherein modifying the distribution of the digital content based on the cluster effect comprises increasing distribution of the digital content to users within clusters comprising multiple users having one or more common attributes.

5. The method of claim 1, further comprising:
    generating a conversion report comprising a representation of the cluster effect; and
    providing the conversion report to a client device.

6. The method of claim 5, wherein the conversion report comprises a selectable option to adjust distribution of digital content to users within clusters comprising multiple users having one or more common attributes.

7. The method of claim 6, wherein the conversion report comprises selectable options to adjust distribution of the digital content to users within clusters of a target demographic or target location.

8. A system comprising:
    at least one processor; and
    at least one non-transitory computer readable storage medium storing instructions that, when executed by the at least one processor, cause the system to:
        generate clusters of users, each cluster having one or more users of a social networking system;
        separate the clusters of users into a first group of clusters and a second group of clusters;
        assign particular clusters of users from the first group of clusters to a first test group and a first control group;
        determine a first incremental lift between the first test group and the first control group from the first group of clusters;
        assign individual users from the second group of clusters to a second test group and a second control group;
        determine a second incremental lift between the second test group and the second control group from the second group of clusters; and
        compare the first incremental lift to the second incremental lift to determine a cluster effect.

9. The system of claim 8, further comprising instructions that, when executed by the at least one processor, cause the system to:
    generate the clusters of users by assigning user identifiers and cluster identifiers to the users of the social networking system; and
    separate the clusters of users into the first group of clusters and the second group of clusters by separating the clusters of users into the first group of clusters and the second group of clusters based on the cluster identifiers.

10. The system of claim 9, further comprising instructions that, when executed by the at least one processor, cause the system to assign the cluster identifiers to the users of the social networking system by applying a clustering algorithm to assign the cluster identifiers to the users of the social networking system.

11. The system of claim 10, further comprising instructions that, when executed by the at least one processor, cause the system to separate the clusters of users into the first group of clusters and the second group of clusters based on the cluster identifiers by randomly assigning a particular cluster of users to the first group of clusters or the second group of clusters based on randomly associating a cluster identifier corresponding to the particular cluster of users with either the first group of clusters or the second group of clusters.

12. The system of claim 9, further comprising instructions that, when executed by the at least one processor, cause the system to:
assign the particular clusters of users from the first group of clusters to the first test group and the first control group by randomly assigning the particular clusters of users from the first group of clusters to the first test group or the first control group based on cluster identifiers; and
assign the individual users from the second group of clusters to the second test group and the second control group by randomly assigning users from the second group of clusters to the second test group or the second control group based on user identifiers.

13. The system of claim 8, further comprising instructions that, when executed by the at least one processor, cause the system to:
determine the first incremental lift between the first test group and the first control group by delivering one or more instances of digital content to the first test group but not to the first control group; and
determine the second incremental lift between the second test group and the second control group by delivering the one or more instances of digital content to the second test group but not to the second control group.

14. The system of claim 8, further comprising instructions that, when executed by the at least one processor, cause the system to generate clusters of users by applying a clustering algorithm to assign one or more users to a particular cluster of users based on attributes of the one or more users.

15. The system of claim 14, further comprising instructions that, when executed by the at least one processor, cause the system to:
apply an alternative clustering algorithm to generate alternative clusters of users, each alternative cluster having one or more users of the social networking system;
separate the alternative clusters of users into an alternative first group of clusters and an alternative second group of clusters;
determine an alternative first incremental lift between an alternative first test group and an alternative first control group each comprising alternative clusters of users from the alternative first group of clusters;
determine an alternative second incremental lift between an alternative second test group and an alternative second control group each comprising individual users from the alternative second group of clusters;
compare the alternative first incremental lift to the alternative second incremental lift to determine an alternative cluster effect; and based on a comparison of the cluster effect and the alternative cluster effect, identify either the clustering algorithm or the alternative clustering algorithm as generating clusters that capture a larger cluster effect.

16. A non-transitory computer readable medium storing instructions thereon that, when executed by at least one processor, cause a computer system to:
generate clusters of users, each cluster having one or more users of a social networking system;
separate the clusters of users into a first group of clusters and a second group of clusters;
assign particular clusters of users from the first group of clusters to a first test group and a first control group;
determine a first incremental lift between the first test group and the first control group from the first group of clusters;
assign individual users from the second group of clusters to a second test group and a second control group;
determine a second incremental lift between the second test group and the second control group from the second group of clusters; and
compare the first incremental lift to the second incremental lift to determine a cluster effect.

17. The non-transitory computer readable medium of claim 16, further comprising instructions that, when executed by the at least one processor, cause the computer system to generate the clusters of users by generating a first cluster comprising a single user and a second cluster comprising multiple users having one or more common attributes.

18. The non-transitory computer readable medium of claim 16, further comprising instructions that, when executed by the at least one processor, cause the computer system to generate the clusters of users by generating clusters of one or more classmates, club members, coworkers, households, neighbors, organizational members, or social-network friends.

19. The non-transitory computer readable medium of claim 16, further comprising instructions that, when executed by the at least one processor, cause the computer system to:
determine the first incremental lift between the first test group and the first control group by determining a first average-spend lift, a first conversion lift, a first incremental-sales lift, a first incremental-consumption lift, a first incremental-spend-amount lift, or a first total-sales lift; and
determine the second incremental lift between the second test group and the second control group by determining a second average-spend lift, a second conversion lift, a second incremental-sales lift, a second incremental-consumption lift, a second incremental-spend-amount lift, or a second total-sales lift.

20. The non-transitory computer readable medium of claim 16, further comprising instructions that, when executed by the at least one processor, cause the computer system to compare the first incremental lift to the second incremental lift to determine the cluster effect by determining a divergence between the first incremental lift and the second incremental lift.

* * * * *